United States Patent
Adachi

(10) Patent No.: US 9,497,340 B2
(45) Date of Patent: Nov. 15, 2016

(54) PRINT CONTROL APPARATUS, PRINT CONTROL METHOD, STORAGE MEDIUM FOR STORING PROGRAM, AND PRINTING SYSTEM

(71) Applicant: CANON KABUSHIKI KAISHA, Tokyo (JP)

(72) Inventor: Minako Adachi, Yamato (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/570,697

(22) Filed: Dec. 15, 2014

(65) Prior Publication Data

US 2015/0181058 A1 Jun. 25, 2015

(30) Foreign Application Priority Data

Dec. 24, 2013 (JP) ................................. 2013-266128

(51) Int. Cl.
G06F 3/12 (2006.01)
H04N 1/00 (2006.01)

(52) U.S. Cl.
CPC ...... H04N 1/00344 (2013.01); H04N 1/00002 (2013.01)

(58) Field of Classification Search
None
See application file for complete search history.

(56) References Cited

U.S. PATENT DOCUMENTS

| 7,581,810 B2* | 9/2009 | Yoshikawa ............ B41J 2/1652 347/23 |
| 7,676,164 B2* | 3/2010 | Shiori .................. G03G 15/553 399/24 |
| 8,099,310 B2* | 1/2012 | Kumisuwa ............. G06Q 10/00 705/7.12 |
| 8,582,988 B2* | 11/2013 | Rapkin et al. .................. 399/24 |
| 2006/0092460 A1* | 5/2006 | Shikata ........................ 358/1.15 |
| 2007/0081828 A1* | 4/2007 | Radulski et al. ............... 399/27 |
| 2008/0309966 A1* | 12/2008 | Scaff ........................... 358/1.15 |
| 2010/0177359 A1* | 7/2010 | Miyazaki ........... H04N 1/00344 358/406 |
| 2011/0216359 A1* | 9/2011 | Kamisuwa ................ G06F 3/12 358/1.15 |
| 2012/0076517 A1* | 3/2012 | Rapkin et al. .................. 399/24 |
| 2013/0003119 A1* | 1/2013 | Yamaguchi ............. G06F 3/121 358/1.15 |

FOREIGN PATENT DOCUMENTS

JP 2009-78409 A 4/2009

* cited by examiner

*Primary Examiner* — Dung Tran
(74) *Attorney, Agent, or Firm* — Fitzpatrick, Cella, Harper & Scinto

(57) ABSTRACT

Degrees of wear of each of common components in respective printing apparatuses is acquired, the common components being used in a plurality of printing apparatuses. Print processing that the respective printing apparatuses are caused to execute is determined, based on the acquired degree of wear of a component for which a maintenance time is long among the common components, in the respective printing apparatuses. A printing apparatus is caused to execute print processing, based on this determination.

16 Claims, 14 Drawing Sheets

BEFORE PRINTING

| PRIORITY ORDER | COMPONENT NAME | MAINTENANCE OPERATION TIME (MIN(S)) | DEGREE OF WEAR (%) IN FIRST PRINTING APPARATUS | DEGREE OF WEAR (%) IN SECOND PRINTING APPARATUS |
|---|---|---|---|---|
| 1 | DRYING UNIT | 100 | 70 | 70 |
| 2 | PRINTING HEAD | 70 | 60 | 40 |
| 3 | CONVEYANCE ROLLER | 45 | 20 | 30 |
| 4 | SKEW CORRECTION UNIT | 30 | 50 | 40 |
| 5 | READING SENSOR | 20 | 40 | 60 |

AFTER PRINTING FOR JOB 1

| PRIORITY ORDER | COMPONENT NAME | MAINTENANCE OPERATION TIME (MIN(S)) | DEGREE OF WEAR (%) IN FIRST PRINTING APPARATUS | DEGREE OF WEAR (%) IN SECOND PRINTING APPARATUS |
|---|---|---|---|---|
| 1 | DRYING UNIT | 100 | 70 | 80 |
| 2 | PRINTING HEAD | 70 | 60 | 50 |
| 3 | CONVEYANCE ROLLER | 45 | 20 | 40 |
| 4 | SKEW CORRECTION UNIT | 30 | 50 | 50 |
| 5 | READING SENSOR | 20 | 40 | 70 |

F I G. 4A

BEFORE PRINTING

| PRIORITY ORDER | COMPONENT NAME | MAINTENANCE OPERATION TIME (MIN(S)) | DEGREE OF WEAR (%) IN FIRST PRINTING APPARATUS | DEGREE OF WEAR (%) IN SECOND PRINTING APPARATUS |
|---|---|---|---|---|
| 1 | DRYING UNIT | 100 | 70 | 70 |
| 2 | PRINTING HEAD | 70 | 60 | 40 |
| 3 | CONVEYANCE ROLLER | 45 | 20 | 30 |
| 4 | SKEW CORRECTION UNIT | 30 | 50 | 40 |
| 5 | READING SENSOR | 20 | 40 | 60 |

F I G. 4B

AFTER PRINTING FOR JOB 1

| PRIORITY ORDER | COMPONENT NAME | MAINTENANCE OPERATION TIME (MIN(S)) | DEGREE OF WEAR (%) IN FIRST PRINTING APPARATUS | DEGREE OF WEAR (%) IN SECOND PRINTING APPARATUS |
|---|---|---|---|---|
| 1 | DRYING UNIT | 100 | 70 | 80 |
| 2 | PRINTING HEAD | 70 | 60 | 50 |
| 3 | CONVEYANCE ROLLER | 45 | 20 | 40 |
| 4 | SKEW CORRECTION UNIT | 30 | 50 | 50 |
| 5 | READING SENSOR | 20 | 40 | 70 |

FIG. 4C

AFTER PRINTING FOR JOB 2

| PRIORITY ORDER | COMPONENT NAME | MAINTENANCE OPERATION TIME (MIN(S)) | DEGREE OF WEAR (%) IN FIRST PRINTING APPARATUS | DEGREE OF WEAR (%) IN SECOND PRINTING APPARATUS |
|---|---|---|---|---|
| 1 | DRYING UNIT | 100 | 80 | 80 |
| 2 | PRINTING HEAD | 70 | 70 | 50 |
| 3 | CONVEYANCE ROLLER | 45 | 30 | 40 |
| 4 | SKEW CORRECTION UNIT | 30 | 60 | 50 |
| 5 | READING SENSOR | 20 | 50 | 70 |

FIG. 4D

AFTER PRINTING FOR JOB 3

| PRIORITY ORDER | COMPONENT NAME | MAINTENANCE OPERATION TIME (MIN(S)) | DEGREE OF WEAR (%) IN FIRST PRINTING APPARATUS | DEGREE OF WEAR (%) IN SECOND PRINTING APPARATUS |
|---|---|---|---|---|
| 1 | DRYING UNIT | 100 | 80 | 90 |
| 2 | PRINTING HEAD | 70 | 70 | 60 |
| 3 | CONVEYANCE ROLLER | 45 | 30 | 50 |
| 4 | SKEW CORRECTION UNIT | 30 | 60 | 60 |
| 5 | READING SENSOR | 20 | 50 | 80 |

F I G. 4E

AFTER PRINTING FOR JOB 4

| PRIORITY ORDER | COMPONENT NAME | MAINTENANCE OPERATION TIME (MIN(S)) | DEGREE OF WEAR (%) IN FIRST PRINTING APPARATUS | DEGREE OF WEAR (%) IN SECOND PRINTING APPARATUS |
|---|---|---|---|---|
| 1 | DRYING UNIT | 100 | 90 | 90 |
| 2 | PRINTING HEAD | 70 | 80 | 60 |
| 3 | CONVEYANCE ROLLER | 45 | 40 | 50 |
| 4 | SKEW CORRECTION UNIT | 30 | 70 | 60 |
| 5 | READING SENSOR | 20 | 60 | 80 |

F I G. 4F

AFTER PERFORMING MAINTENANCE OF DRYING UNIT

| PRIORITY ORDER | COMPONENT NAME | MAINTENANCE OPERATION TIME (MIN(S)) | DEGREE OF WEAR (%) IN FIRST PRINTING APPARATUS | DEGREE OF WEAR (%) IN SECOND PRINTING APPARATUS |
|---|---|---|---|---|
| 1 | DRYING UNIT | 100 | 0 | 0 |
| 2 | PRINTING HEAD | 70 | 80 | 60 |
| 3 | CONVEYANCE ROLLER | 45 | 40 | 50 |
| 4 | SKEW CORRECTION UNIT | 30 | 70 | 60 |
| 5 | READING SENSOR | 20 | 60 | 80 |

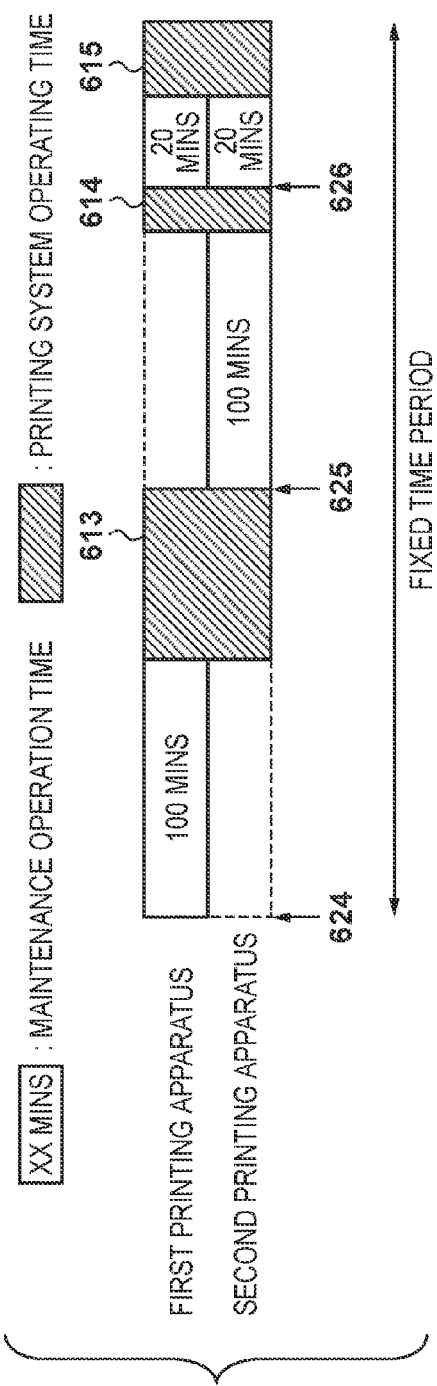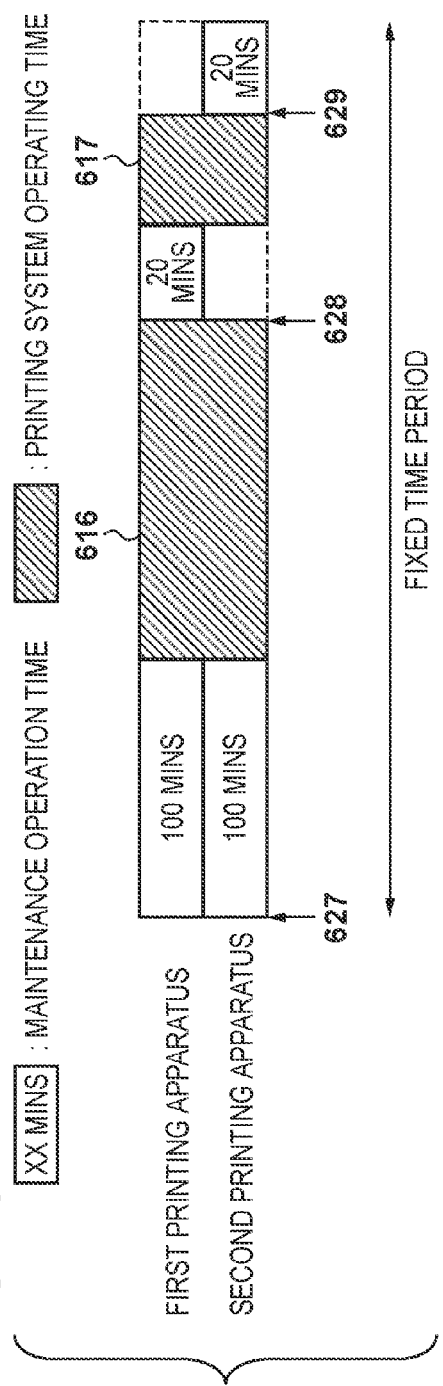

F I G. 7

| PRIORITY ORDER | UNIT OF WEAR | MAINTENANCE OPERATION TIME (MIN(S)) | DEGREE OF WEAR (%) IN FIRST PRINTING APPARATUS | DEGREE OF WEAR (%) IN SECOND PRINTING APPARATUS | COMPONENT NAME |
|---|---|---|---|---|---|
| 1 | ENERGIZING TIME 1 | 300 | 50 | 50 | DRYING UNIT, HUMIDIFYING UNIT, CONVEYANCE ROLLER, SKEW CORRECTION UNIT |
| 2 | DOT COUNT | 70 | 60 | 40 | PRINTING HEAD |
| 3 | ENERGIZING TIME 2 | 40 | 20 | 30 | SUPPLY PUMP, FLOW PATH FILTER |
| 4 | NUMBER OF TIMES OF BACK-FACE PRINTING | 30 | 50 | 40 | BACK-FACE PRINT HEAD, INK RIBBON |
| 5 | NUMBER OF READ IMAGES | 20 | 70 | 60 | READING SENSOR |

FIG. 8

| PRIORITY ORDER | COMPONENT NAME | MAINTENANCE OPERATION TIME (MIN(S)) | MAINTENANCE USER | DEGREE OF WEAR (%) IN FIRST PRINTING APPARATUS | DEGREE OF WEAR (%) IN SECOND PRINTING APPARATUS |
|---|---|---|---|---|---|
| 1 | DRYING UNIT | 100 | OP | 50 | 50 |
| 2 | PRINTING HEAD | 70 | OP | 60 | 40 |
| 3 | CIRCULATING PUMP UNIT | 60 | SA | 40 | 50 |
| 4 | CONVEYANCE ROLLER | 45 | OP | 20 | 30 |
| 5 | SKEW CORRECTION UNIT | 20 | OP | 50 | 40 |

F I G. 10

| PRIORITY ORDER | COMPONENT NAME | MAINTENANCE OPERATION TIME (MIN(S)) | DEGREE OF WEAR (%) IN FIRST PRINTING APPARATUS | DEGREE OF WEAR (%) IN SECOND PRINTING APPARATUS | EXPECTED TIME (MIN(S)) UNTIL MAINTENANCE TIMING IN APPARATUS WITH LARGER DEGREE OF WEAR (%) |
|---|---|---|---|---|---|
| 1 | DRYING UNIT | 100 | 70 | 50 | 43200 |
| 2 | PRINTING HEAD | 70 | 50 | 70 | 1200 |
| 3 | CONVEYANCE ROLLER | 45 | 40 | 50 | 2880 |
| 4 | SKEW CORRECTION UNIT | 30 | 20 | 50 | 7200 |
| 5 | READING SENSOR | 20 | 40 | 60 | 10080 |

PRINT CONTROL APPARATUS, PRINT CONTROL METHOD, STORAGE MEDIUM FOR STORING PROGRAM, AND PRINTING SYSTEM

BACKGROUND OF THE INVENTION

1. Field of the Invention

The present invention relates to a print control apparatus and a print control method for controlling printing apparatuses in a printing system including a plurality of printing apparatuses, a storage medium for storing a program, and a printing system.

2. Description of the Related Art

Conventionally, a tandem printing system is known as a system in which a plurality of printing apparatuses are connected in series, and the same printing material, e.g., a continuous sheet or the like is sequentially printed by the printing apparatuses. In regard to a system in which two printing apparatuses are connected in series, for example, in the case of two-sided printing, a method is known by which a first face (front face) of a continuous sheet is printed by a first printing apparatus, the continuous sheet is inverted (reversed) by an reverse apparatus, and thereafter a second face (back face) of the same continuous sheet is printed by a second printing apparatus. In the case of one-sided printing, a method is known by which the first face or the second face of the continuous sheet is printed by the first printing apparatus or the second printing apparatus.

Japanese Patent Laid-Open No. 2009-78409 describes a system in which, when the degrees of consumption of the same type of consumable items or the degrees of accumulation of wastes in the first printing apparatus and the second printing apparatus are compared and the result of this comparison is that a predetermined difference has occurred, tasks allotted to the first printing apparatus and the second printing apparatus are interchanged until this difference is resolved. In this system, if the predetermined difference has occurred in the degrees of consumption of a plurality of consumable items, it is determined whether to interchange printing tasks, based on the consumable item whose degree of consumption is largest, or the waste whose degree of accumulation is largest.

However, it is not considered in Japanese Patent Laid-Open No. 2009-78409 that the work time taken for replacing, disposing of, or cleaning a component (hereinafter referred to as maintenance) differs depending on the type of the consumable item or the waste (hereinafter referred to as a component). Accordingly, if the timings of the maintenance of components for which a maintenance work time is long are different, the operations cannot be performed in parallel, and the maintenance work time for the two apparatuses is taken, resulting in a long stop time of the printing system.

SUMMARY OF THE INVENTION

An aspect of the present invention is to eliminate the above-mentioned problems with the conventional technology. The present invention provides a print control apparatus and a print control method that reduce the stop time of the printing system generated due to occurrence of a maintenance operation in each of a plurality of printing apparatuses, a storage medium for storing a program, and a printing system.

The present invention in one aspect provides a print control apparatus a print control apparatus comprising: an acquisition unit configured to acquire degrees of wear of components in respective printing apparatuses, the components being used in common in a plurality of printing apparatuses; a determination unit configured to determine print processing that the respective printing apparatuses are caused to execute, in accordance with a degree of wear of, among the components, a component for which a maintenance time is long in the respective printing apparatuses; and a control unit configured to cause a printing apparatus to execute print processing, based on a determination by the determination unit.

According to the present invention, it is possible to reduce the stop time of a printing system generated due to occurrence of a maintenance operation in each of a plurality of printing apparatuses.

Further features of the present invention will become apparent from the following description of exemplary embodiments with reference to the attached drawings.

BRIEF DESCRIPTION OF THE DRAWINGS

FIGS. 4A to 4F are diagrams showing exemplary component maintenance management tables.

FIGS. 6A to 6D are diagrams showing system operating time when maintenance is performed.

FIG. 7 is a diagram showing another exemplary component maintenance management table.

FIG. 8 is a diagram showing another exemplary component maintenance management table.

FIG. 10 is a diagram showing another exemplary component maintenance management table.

DESCRIPTION OF THE EMBODIMENTS

Figure 1:
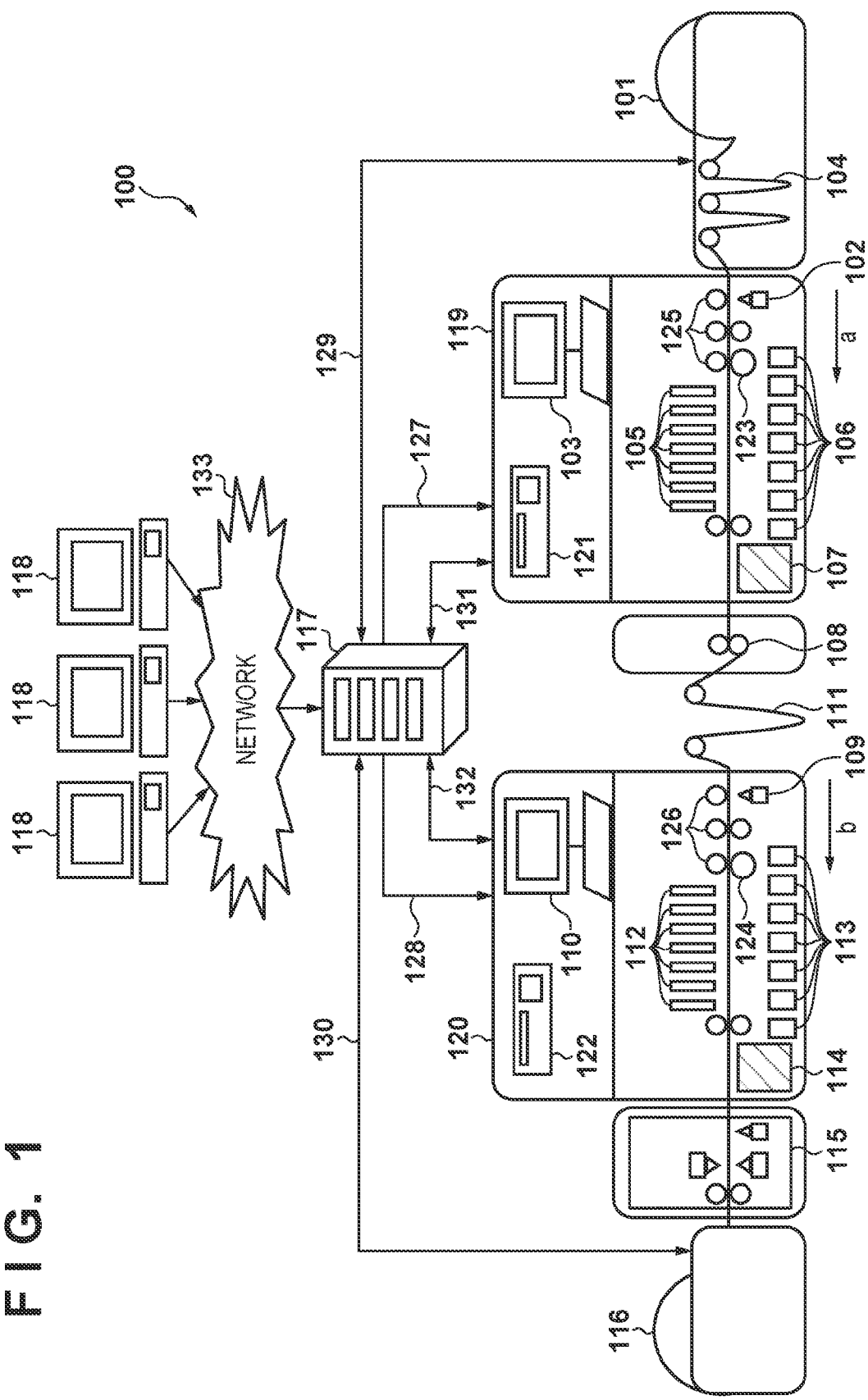
FIG. 1 is a diagram showing a schematic configuration of a tandem printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals will be given to the same constituent elements, and a repetitive description thereof will be omitted.

First Embodiment

FIG. 1 is a diagram showing a schematic configuration of a tandem printing system (hereinafter also referred to simply as a printing system), which serves as an example in the present embodiment. Although the printing system in FIG. 1 has only a printing function, the present invention is not limited thereto, and the printing system may further include a reading apparatus for reading out an image on an original such that a copying function can be executed, or may include other additional functions such that multiple functions can be executed. Although the following description will take an example where a rolled sheet is used as a printing material (printing medium or printing sheet) on which printing processing is performed, the printing material is not limited to a rolled material as long as it is an elongated continuous sheet on which printing for multiple pages on the same face can be continuously performed without cutting out the sheet in the middle. The continuous sheet may be automatically cut out by a printing apparatus, or may be cut out by a user giving a manual instruction. Alternatively, the sheet may be cut out in a post-process. The material of the printing material is not limited to paper, and various kinds of material on which printing processing can be performed may be used. Each printing apparatus may be a printing apparatus that can print not only on the continuous sheet but also on a cut sheet that is cut in advance in a predetermined size. The printing method is not limited to image printing by means of an inkjet printing method using later-described liquid ink for image printing. Solid ink may be used as a printing agent, and various printing methods such as an electrophotographic method using toner or a sublimation method may be employed. Each printing apparatus is not limited to one that performs color printing using printing agents of multiple colors, and may also be one that performs monochrome printing using only black color (including gray). Printing is not limited to printing of a visible image, and may be printing of an invisible image or an image that is difficult to see, and various types of print target other than a general image may be printed, e.g., a wiring pattern, a physical pattern in manufacturing of component, a DNA sequence, or the like may be printed. That is to say, the present invention is applicable to various types of printing apparatus as long as a printing agent can be attached to a printing material. In the case of controlling a printing processing operation in each printing apparatus in accordance with an instruction from a connected external apparatus separate from the printing system in FIG. 1, this external apparatus will serve as a print control apparatus.

FIG. 1 is a cross-sectional view showing an outline of an overall configuration of a printing system that uses a rolled sheet (a continuous sheet that is continuous and longer in the conveyance direction than the length of a print unit (one page)) as a printing material. The printing system 100 includes the following constituent elements 101 to 133, which are arranged in a plurality of housings. A printing system 100 includes a first printing apparatus 119, a second printing apparatus 120, a paper feed unit 101, a rolling unit 116, a sheet reverse unit 108, and a scanner unit 115. The paper feed unit 101 supplies a rolled sheet (hereinafter referred to simply as a sheet). The rolling unit 116 rolls up the sheet on which printing has finished. The sheet reverse unit 108 reverses front and back faces of the sheet. The scanner unit 115 optically reads out an image that has finished being printed and checks the image. The controller 117 controls the first printing apparatus 119 and the second printing apparatus 120, and performs RIP processing. Each host computer (job control apparatus) 118 transmits a print job to the controller 117 via a network 133.

Each host computer 118 transmits a print job to the controller 117 on the network 133. Each host computer 118 selects an image to be printed, configures settings of print size, layout, and the like, and generates a print job. Although the host computers 118 in the network 133 are shown as apparatuses that transmit generated print jobs, these apparatuses may be other host computers directly connected to the controller 117 or portable media such as USB memories.

Each host computer 118 also acquires the progress of the transmitted print job from the controller 117, the first printing apparatus 119, and the second printing apparatus 120, and manages it.

The controller 117 receives a print job from the host computers 118, performs the RIP processing for this print job, and transmits print data to the first printing apparatus 119 and the second printing apparatus 120 through data communication interfaces (hereinafter referred to simply as IFs) 127 and 128. The data communication IFs 127 and 128 are constituted by interfaces capable of high-speed data transmission and reception, such as optical fibers, and can transmit a large volume of print data from the controller 117 to the first printing apparatus 119 and the second printing apparatus 120. Note that, although a configuration is shown in which reception of a print job from the host computers 118 and the RIP processing are performed by the controller 117, reception of a print job may be performed by another computer, or the RIP processing may be performed by another computer. Alternatively, as in a server configuration, print job reception and execution of the RIP processing may be separately performed by respective internal blades. That is to say, the configuration of the host computers, the network, and the controller is not limited to the mode shown in FIG. 1.

The controller 117 transmits a control command to the first printing apparatus 119, the second printing apparatus 120, the paper feed unit 101, and the rolling unit 116 through control communication IFs 129, 130, 131, and 132, and controls these apparatuses. The controller 117 also transmits print job information and various setting data necessary for printing and control to the first printing apparatus 119 and the second printing apparatus 120 through the control communication IFs 131 and 132. The controller 117 also acquires information regarding a state of each printing apparatus and progress information regarding whether printing of a print job is being performed or has finished, and the like, from the first printing apparatus 119 and the second printing apparatus 120.

The first printing apparatus 119 receives print data that has undergone the RIP processing, from the controller 117 through the data communication IF 127. The first printing apparatus 119 includes a reading sensor 102 that reads a mark printed on a sheet, printing heads 105, ink tanks 106 that supply ink to the printing heads 105, a drying unit 107 that dries ink of an image printed on the sheet, and an operation unit 103. The operation unit 103 is a unit for receiving various operations performed by the user and notifying the user of various kinds of information. For example, the user can check printing status, such as whether an image is being printed or has finished being printed, with respect to each order. The user can also operate and check the operation unit 103 in order to check information regarding various kinds of statuses of the apparatuses such as the amount of remaining ink and the amount of remaining sheet, input a printing head position adjustment value and a registration adjustment value, and give an instruction to perform apparatus maintenance such as cleaning of the printing heads. The first printing apparatus 119 also includes a control unit 121, an encoder 123 that controls the amount of conveyance and a conveyance state, and a conveyance roller 125. The control unit 121 contains a control portion including a controller (a CPU or an MPU), a device for outputting user interface information (a device for generating display information, sound information, etc.), and various I/O interfaces, and comprehensively controls the overall first printing apparatus 119. The configuration of the first printing apparatus 119 is not limited thereto, and a unit or a sensor for achieving various objects may be added as appropriate.

The second printing apparatus 120 receives the print data from the controller 117 through the data communication IF 128. The second printing apparatus 120 includes a reading sensor 109 that reads a mark printed on the sheet, printing heads 112, ink tanks 113 that supply ink to the printing heads 112, a drying unit 114 that dries ink of an image printed on the sheet, and an operation unit 110. The operation unit 110 is a unit for receiving various operations performed by the user and notifying the user of various kinds of information. For example, the user can check printing status, such as whether an image is being printed or has finished being printed, with respect to each order. The user can also operate and check the operation unit 110 in order to check information regarding various kinds of statuses of the apparatuses such as the amount of remaining ink and the amount of remaining sheet, input a printing head position adjustment value and a registration adjustment value, and give an instruction to perform apparatus maintenance such as cleaning of the printing heads. The second printing apparatus 120 also includes a control unit 122, an encoder 124 that controls the amount of conveyance and a conveyance state, and a conveyance roller 126. The control unit 122 contains a control portion including a controller (a CPU or an MPU), a device for outputting user interface information (a device for generating display information, sound information, etc.), and various I/O interfaces, and comprehensively controls the overall second printing apparatus 120. The configuration of the second printing apparatus 120 is not limited thereto, and a unit or a sensor for achieving various objects may be added as appropriate.

In the present embodiment, the first printing apparatus 119 and the second printing apparatus 120 have the same configuration. However, they may have different configurations such that, for example, a control board for controlling the paper feed unit 101 is installed only in the first printing apparatus 119, and the configuration is not limited to that in FIG. 1.

The paper feed unit 101 performs control for conveying the sheet to the first printing apparatus 119. The user attaches the sheet to a control bar within the paper feed unit 101, and thereafter loads the sheet onto the body of the paper feed unit 101. The paper feed unit 101 receives an instruction to start paper feed, from the controller 117 through the control communication IF 129, and starts to convey the paper. The paper feed unit 101 also includes a loop control unit 104 that absorbs an error in the conveyance speed, and can adjust the conveyance speed. Although the loop control unit 104 is provided in the paper feed unit 101 in the present embodiment, a loop control unit that adjusts the conveyance speed may be provided within the first printing apparatus 119. The sheet withdrawn from the paper feed unit 101 is conveyed in a direction a in FIG. 1, and reaches the first printing apparatus 119. Although FIG. 1 shows a configuration of supplying a rolled sheet as the paper feed unit 101, the paper feed unit 101 may also supply cut paper, or may supply a continuous sheet that is not in rolled shape.

The first printing apparatus 119 prints an image in accordance with the print data received from the controller 117. The printing heads 105 for multiple colors are independent and are held in the sheet conveyance direction. In the present embodiment, the printing heads 105 have seven printing heads corresponding to seven colors, namely C (cyan), M (magenta), Y (yellow), LC (light cyan), LM (light magenta), G (gray), and K (black). In the present embodiment, a color other than these colors may also be used, and all of these colors do not have to be used. The first printing apparatus 119 causes ink to be discharged from the printing heads 105 and forms an image on the sheet in synchronization with conveyance of the sheet.

Note that the printing heads 105 are arranged at positions where destinations of discharged ink do not overlap the conveyance roller 125. Although the present embodiment employs a configuration in which ink is directly discharged to the sheet, an alternative configuration may be employed in which ink is attached to an intermediate transfer member and this ink is thereafter attached to the sheet to thereby form an image. The ink tanks 106 independently store ink of the respective colors. The ink is supplied by tubes from the ink tanks 106 to sub-tanks (not shown) provided so as to correspond to the respective colors, and the ink is supplied via tubes from the sub-tanks to the respective printing heads 105.

As the printing heads 105, line-type printing heads corresponding to the respective colors are arranged in the direction a, which is the conveyance direction at the time of printing. The line-type printing heads for the respective colors may be seamlessly constituted by a single nozzle chip, or may be divided nozzle chips that are arranged in a line or regularly arranged as in a staggered arrangement. In the present embodiment, the printings heads 105 are so-called full line-type multi-printing heads in which nozzles are arranged in a range that covers the width of the printable area of a maximum-size sheet which can be used in the printing apparatuses. As an inkjet printing method in which ink is discharged from nozzles, a method using a heat-generating element, a method using a piezo element, a method using an electrostatic element, a method using a MEMS element, or the like may be employed. Ink is discharged from the nozzle of each printing head based on the print data, and the discharging timing is determined by an output signal of the conveyance encoder 123. Note that, although the present embodiment describes an example of an inkjet printer using ink as a printing agent, the present invention is not limited thereto. For example, printers of various printing methods, such as a thermal printer (sublimation type, thermal transfer type, etc.), a dot impact printer, an LED printer, and a laser printer (electrophotographic method) may be applied.

The sheet on which an image has been formed is conveyed to the drying unit 107. The drying unit 107 heats the sheet passing through the inside of the unit with warm air (warmed gas (air)) in order to dry the sheet to which the ink is attached, in a short time. Note that, in place of using warm air, various drying methods may be employed such as drying with cool air, warming with a heater, air drying only by causing the sheet to wait, and drying with irradiation of electromagnetic waves such as ultraviolet light.

After the drying of the image printed on the sheet finishes, the sheet is conveyed to the sheet reverse unit 108. The sheet reverse unit 108 reverses front and back faces of the sheet in order to print on the back face of an image on the first face that has been printed by the first printing apparatus 119. The reversed sheet reaches the second printing apparatus 120 via a loop control unit 111 that absorbs an error in the conveyance speed. Although the loop control unit 111 is provided downstream of the sheet reverse unit 108 in the present embodiment, the loop control unit 111 may be provided within the second printing apparatus 120. Note that the sheet reverse unit 108 is detachable. In the case of performing one-sided printing as in a later-described flow, a configuration is possible in which the sheet reverse unit 108 is detached and the first face is printed by both the first printing apparatus 119 and the second printing apparatus 120.

The second printing apparatus 120 prints an image in accordance with the print data received from the controller 117. Initially, the reading sensor 109 detects a printed position on the first face, optically reads a mark printed for image identification regarding what kind of image is printed on the first face, and defines the image to be printed on the second face corresponding to the first face and determines the position where the image starts to be printed on the second face. The second printing apparatus 120 determines the print timing of the image to be printed on the second face, in accordance with the result of reading by the reading sensor 109.

The printing heads 112, the ink tanks 113, and the drying unit 114 have configurations similar to the printing heads 105, the ink tanks 106, and the drying unit 107 in the first printing apparatus 119, respectively, and accordingly a description thereof will be omitted. Similarly, the conveyance encoder 124 and the conveyance roller 126 have configurations similar to the conveyance encoder 123 and the conveyance roller 125 in the first printing apparatus 119, respectively, and accordingly a description thereof will be omitted.

After the drying of the image printed on the sheet finishes, the sheet is conveyed to the scanner unit 115. In the scanner unit 115, two scanner sensors are arranged so as to face each other such that both faces of the sheet can be simultaneously read, and simultaneously read images printed on both faces of the sheet and check the image. For example, the scanner unit 115 optically reads the printed images and special patterns on the sheet to check whether the printed image has any problem and check a state of the printing apparatuses such as an ink discharging state. In the present embodiment, as a method for checking the images, a pattern for checking the state of the printing heads may be read to check the ink discharging state, or it may be checked whether or not printing is successful, by means of comparison with original images. Furthermore, a user may select a checking method from among various methods as appropriate on the operation unit. If it is determined during the checking of the state of images and of the apparatuses that the state is not good, the corresponding image may be punched or attached a mark such that it can be checked which image is not in a good state. Although the present embodiment employs a configuration in which two scanner sensors are installed on the downstream side of the second printing apparatus 120 to simultaneously read both faces, the present invention is not limited thereto. For example, a configuration may be employed in which the first scanner is arranged immediately after the first printing apparatus 119 to scan an image printed on the first face and perform the check, and the second scanner is arranged after the second printing apparatus 120 to scan an image printed on the second face and perform the check. Apart from reading with the scanner, reading may be performed using an area sensor such as a camera. After the scanning finishes, the sheet is conveyed to the rolling unit 116.

The rolling unit 116 rolls up the printed sheet discharged from the second printing apparatus 120. The rolling unit 116 starts the rolling operation after receiving a rolling instruction from the controller 117 through the control communication IF 130, and rolls up the sheet with both faces printed. Note that the printing system in the present embodiment is capable of both one-sided printing and two-sided printing. In the case of one-sided printing, printing may be performed by either the first printing apparatus 119 or the second printing apparatus 120. Furthermore, the first printing apparatus 119 and the second printing apparatus 120 may have different roles for each job, each page, or each image in a page. In the case of two-sided printing, the first printing apparatus 119 may print on the first face and the second printing apparatus 120 may print on the second face, or the first printing apparatus 119 may print on the second face and the second printing apparatus 120 may print on the first face.

Although the present embodiment describes a printing system constituted by two printing apparatuses, the present invention is not limited thereto. Three or more printing apparatuses may be connected in series, or a configuration may be employed in which multiple sets of two printing apparatuses connected in series are configured in parallel and controlled by the single controller 117.

Figure 2:
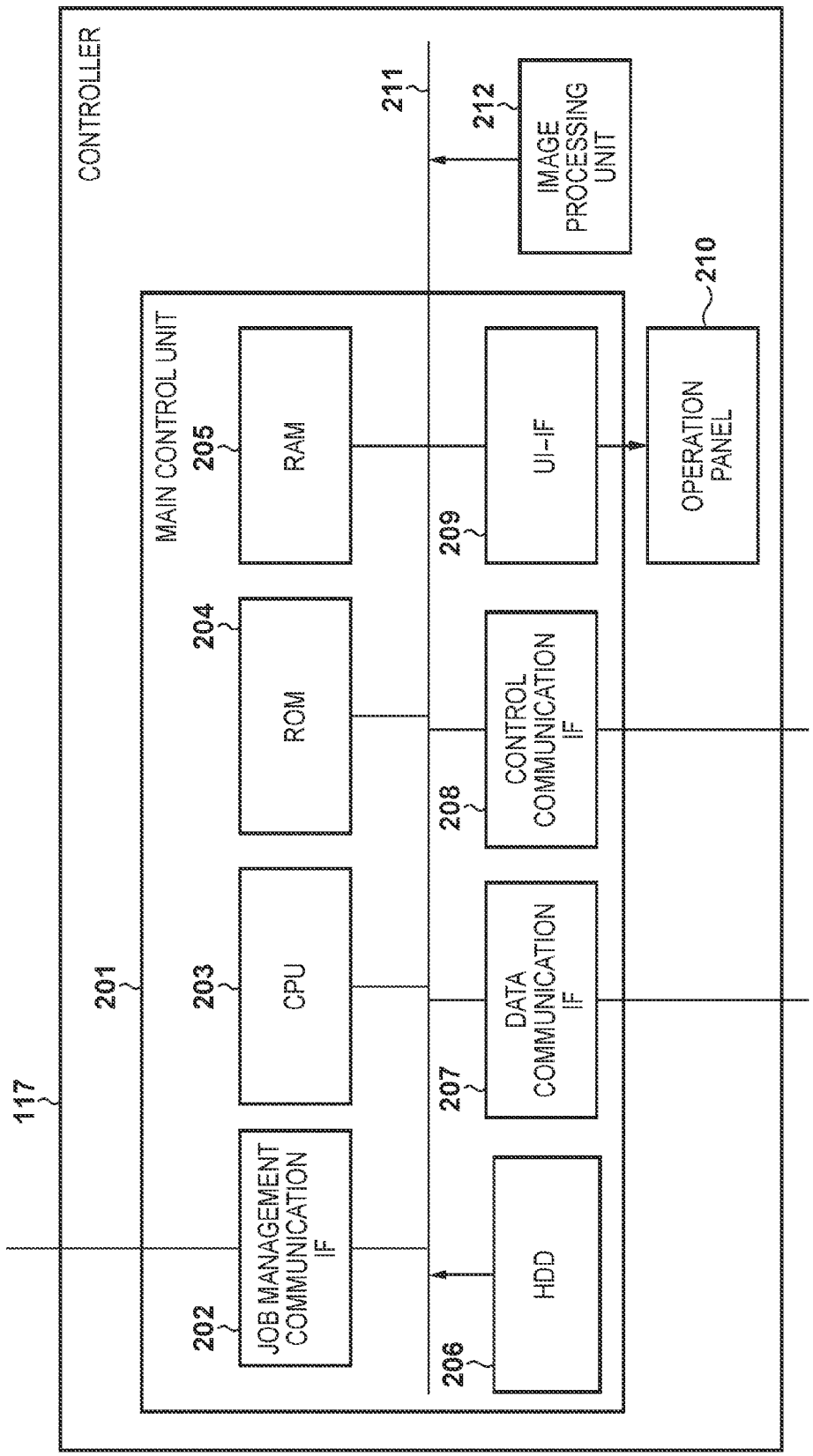
FIG. 2 is a block diagram for illustrating a configuration of a controller.

FIG. 2 is a block diagram for illustrating a configuration of the controller 117 in the present embodiment. In FIG. 2, the controller 117 includes a main control unit 201 and an image processing unit 212. These are communicably connected to each other by the system bus 211. The main control unit 201 is a primary control unit of the controller 117. The main control unit 201 converts a print job supplied from the host computers 118 into print data at the image processing unit 212. Furthermore, the main control unit 201 controls printing in the first printing apparatus 119 and the second printing apparatus 120 to which the main control unit 201 is connected via a control communication IF 208 and a data communication IF 207. The main control unit 201 includes a job management communication IF 202, a CPU 203, a ROM 204, a RAM 205, a HDD 206, the data communication IF 207, the control communication IF 208, and a UI-IF 209. These are communicably connected to each other by the system bus 211. The image processing unit 212 includes a CPU, a ROM, and a RAM, similarly to the main control unit 201.

The job management communication IF 202 is an IF for transmitting and receiving a print job and other commands that are supplied from the host computers 118, a status signal, and the like. The CPU 203 performs various calculations, and comprehensively controls the overall controller 117. The ROM 204 stores fixed data and various control programs to be executed by the CPU 203. The RAM 205 is used as a working area for the CPU 203 when performing various calculations and control. The HDD 206 temporarily stores print job supplied from the host computers 118, necessary tables, print data acquired from the image processing unit 212, and the like. The data communication IF 207 is an IF for transmitting the print data stored in the HDD 206 to the first printing apparatus 119 and the second printing apparatus 120. The control communication IF 208 is an IF for transmitting and receiving a control command, a status signal, and the like between the first printing apparatus 119 and the second printing apparatus 120. The UI-IF 209 is an IF for transmitting and receiving a command and the like to/from an operation panel 210.

The operation panel 210 is an input apparatus with which the user operates the first printing apparatus 119 and the second printing apparatus 120 and configures print settings or the like. Furthermore, the operation panel 210 is also a display apparatus for notifying the user of status or the like of the first printing apparatus 119 and the second printing apparatus 120. The operation panel 210 is connected to the system bus 211 via the UI-IF 209. The image processing unit 212 converts a color space (e.g., YCbCr) of a print job into a standard RGB color space (e.g., sRGB), in accordance with a control command received from the main control unit 201. Various kinds of image processing such as resolution conversion into a valid pixel number, image analysis, and image correction are executed as necessary. The print data obtained as a result of the above image processing is stored in the HDD 206.

Figure 3:
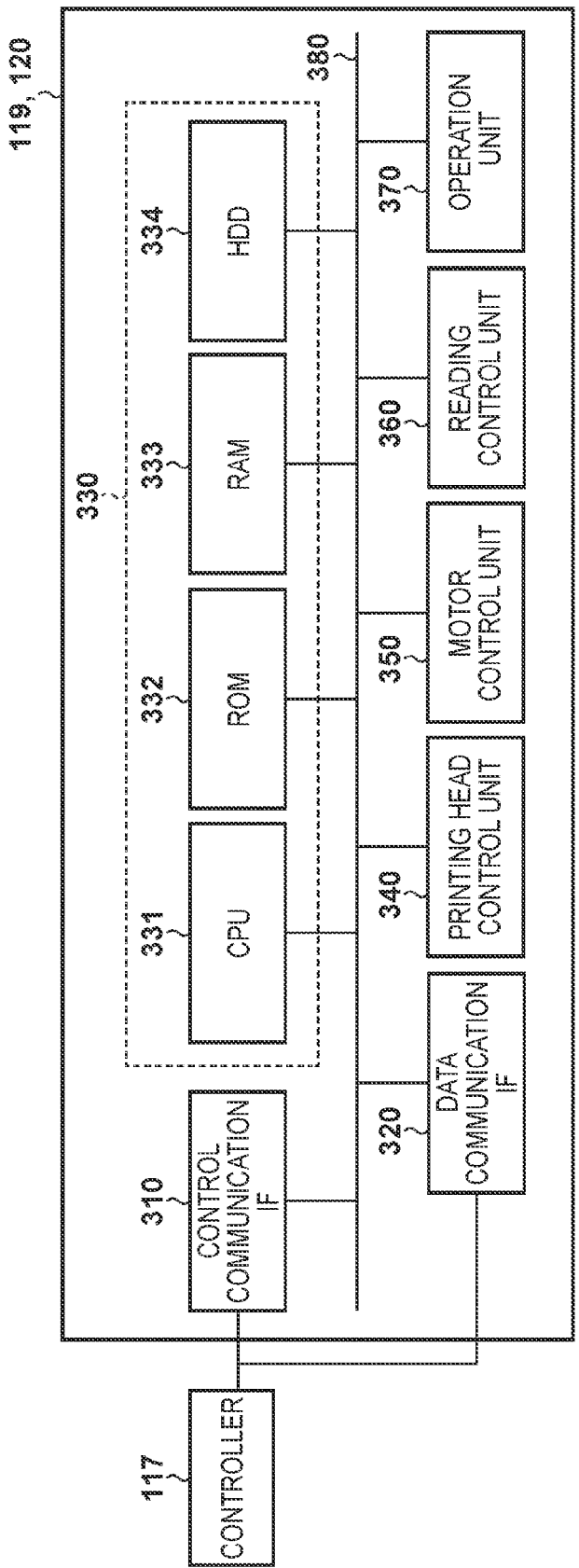
FIG. 3 is a block diagram showing a control configuration of a first printing apparatus and a second printing apparatus.

FIG. 3 is a block diagram showing a control configuration of the first printing apparatus 119 and the second printing apparatus 120. Note that although the first printing apparatus 119 and the second printing apparatus 120 have the same configuration in the present embodiment described below, they may have different configurations. The first printing apparatus 119 and the second printing apparatus 120 each include a control communication IF 310, a data communication IF 320, an engine control unit 330, a printing head control unit 340, a motor control unit 350, a reading control unit 360, and an operation unit 370. These constituent elements are communicably connected to each other by a system bus 380.

The engine control unit 330, the printing head control unit 340, the motor control unit 350, and the reading control unit 360 shown in FIG. 3 are included mainly in both the control units 121 and 122. The operation unit 370 is included in both the operation units 103 and 110. The control communication IF 310 and the data communication IF 320 are IFs for connecting the first printing apparatus 119 and the second printing apparatus 120 to the controller 117. The control communication IF 310 is an IF for receiving a control command, a status signal, and the like from the controller 117. The data communication IF 320 is an IF for receiving print data from the controller 117.

The engine control unit 330 includes a CPU 331, a ROM 332, a RAM 333, and a HDD 334, and these constituent elements are communicably connected to each other by the system bus 380. The CPU 331 performs various calculations, and comprehensively controls the overall first printing apparatus 119 or the overall second printing apparatus 120. The ROM 332 stores various control programs to be executed by the CPU 331 and necessary fixed data for various operations of the printing apparatuses. The RAM 333 is used as a working area for the CPU 331 and as an area for temporarily storing various kinds of received data, and stores various kinds of setting data. The HDD 334 stores necessary parameters for various operations of the printing apparatuses, necessary tables, and the like.

The engine control unit 330 controls the printing head control unit 340, the motor control unit 350, and the reading control unit 360 and prints print data in the printing medium, in accordance with a control command received from the controller 117 via the control communication IF 310. The printing head control unit 340 controls driving of the printing heads 105 and 112 in accordance with a control command received from the engine control unit 330 via the system bus 380 and print data received from the controller 117 via the data communication IFs. The print data is thereby printed on the printing medium.

The motor control unit 350 performs control of a conveyance mechanism, such as control of driving of the conveyance rollers 123 and 126, in accordance with a control command received from the engine control unit 330 via the system bus 380. The reading control unit 360 detects a mark or the like printed on the printing medium, using the reading sensors 102 and 109, in accordance with a control command received from the engine control unit 330 via the system bus 380. The operation unit 370 is a user input/output IF, and includes an input unit such as hard keys or a touch panel and an output unit such as a display for presenting various kinds of information or a sound generator. The operation unit 370 receives settings of necessary parameters for various operations of the printing apparatuses, and displays a printing state and the paper to be used, or the like.

Note that, although the engine control unit 330 controls the printing head control unit 340, the motor control unit 350, and the reading control unit 360 in accordance with a control command received from the controller 117 in the following description of the present embodiment, the present invention is not limited thereto. For example, a control command may be transmitted and received among the control units, or the control units may directly receive a control command from the controller 117. Although the printing head control unit 340 directly receives print data from the controller 117 in the following description of the present embodiment, the present invention is not limited thereto. For example, the engine control unit 330 may receive print data from the controller 117, and the print data may be transmitted from the engine control unit 330 to the printing head control unit 340 via the system bus 380.

FIGS. 4A to 4F are diagrams showing exemplary component maintenance management tables in the present embodiment. The component maintenance management table is a table that is stored in the HDD or the like in the controller 117 and is referenced and updated when printing is executed. The details will be described later.

Figure 5:
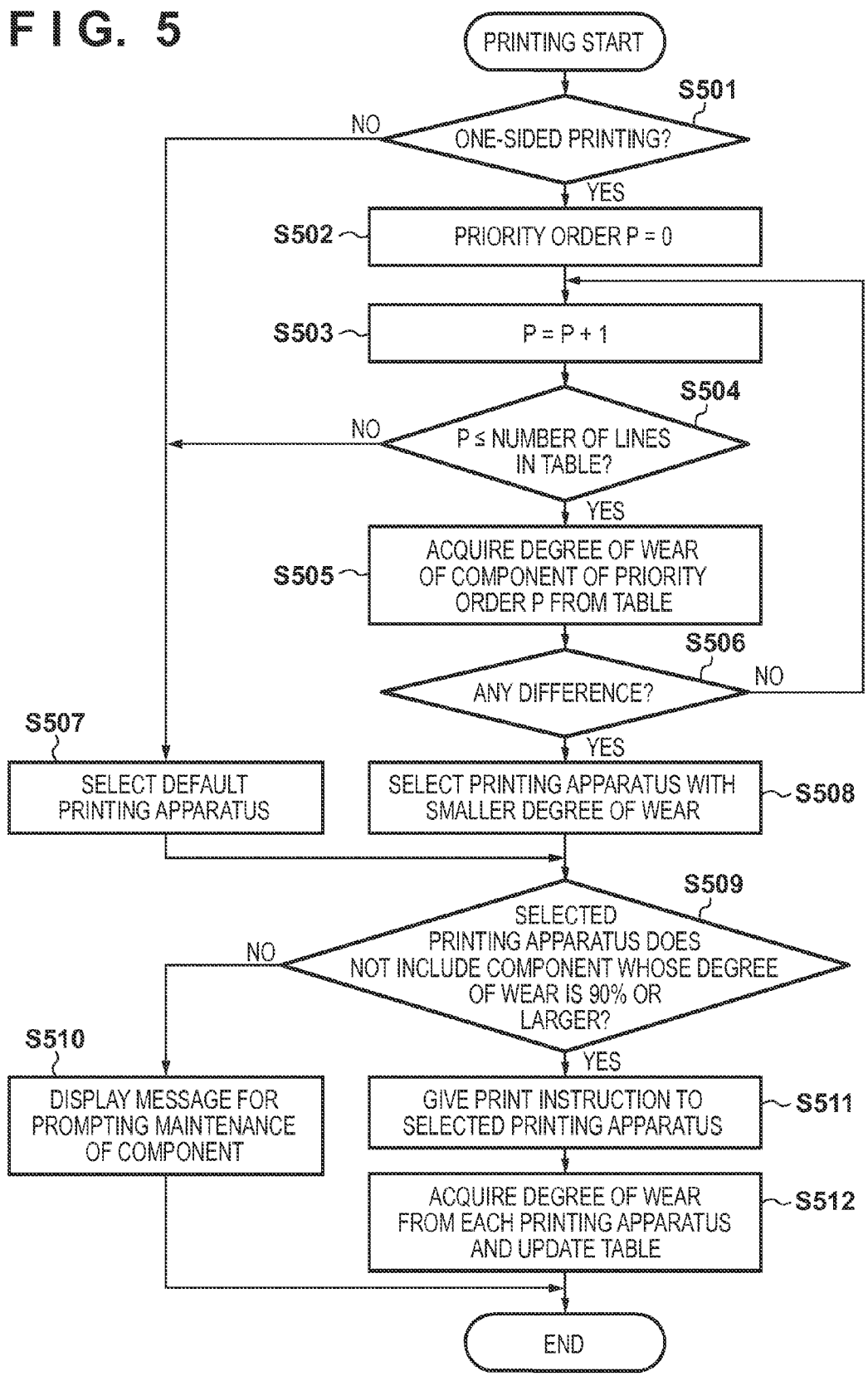
FIG. 5 is a flowchart showing a procedure of print control processing.

FIG. 5 is a flowchart showing an overall sequence of a print control operation at the time of printing of a job, the operation being controlled by the main control unit 201 of the controller 117.

In step S501, the controller 117 determines whether the print job received from the host computers 118 is a print job for one-sided printing. Here, if it is determined that the received print job is a print job for one-sided printing, the processing proceeds to step S502, and if it is determined that the received print job is not a print job for one-sided printing, e.g., if it is a print job for two-sided printing or the like, the processing proceeds to step S507. In steps S502 to S506, it is determined which of the first printing apparatus 119 and the second printing apparatus 120 to use, by referencing the component maintenance management table.

The details of the component maintenance management table will now be described. FIGS. 4A to 4F are diagrams showing exemplary component maintenance management tables in the present embodiment. The component maintenance management table stores the degree of wear (damage caused by use) of each component included in both the first printing apparatus 119 and the second printing apparatus 120, and a maintenance work time taken for maintenance such as replacement or cleaning that is performed when each component reaches a maintenance timing. The degree of wear refers to a percentage of the amount of use until now in the lifetime (use limit) of each component. For example, if the component is the drying unit, the degree of wear refers to the percentage of the drying operating time until now in the usable time period (lifetime) of the drying unit. If the component is the printing heads, the degree of wear refers to the percentage of the amount of ink consumed until now in the amount of ink packed in the printing heads. A larger value of the degree of wear indicates that the maintenance timing will come sooner.

In the component maintenance management table, priority order is given to the components in descending order of the length of the work time. This priority order is the order used as a determination criterion for assigning printing to the first printing apparatus and the second printing apparatus. This aims for preferentially making the degree of wear of a component for which a longer maintenance operation is taken uniform in the first printing apparatus 119 and the second printing apparatus 120 such that the timing of performing the maintenance operation simultaneously comes in the first printing apparatus 119 and the second printing apparatus 120. The maintenance work time will be referred to simply as a maintenance time or a work time below.

Here, it is assumed that the work time is a total time of an operation manually performed by a person and processing automatically performed by each printing apparatus when the maintenance is executed, i.e., a total time during which the printing apparatus stops while the maintenance is executed. A set value of the work time for each component may be defined in advance, or may be appropriately changed by the user, or a serviceperson may connect a dedicated PC to the controller 117 so as to be able to change the set value by an operation from the dedicated PC. Alternatively, an average work time that has been actually taken for maintenance may be calculated from the past maintenance prints so as to dynamically change the set value. Although FIGS. 4A to 4F show five exemplary components, which are the drying unit, the print heads, the conveyance roller, a skew correction unit, and the reading sensor, the components are not limited thereto, and a plurality of components need only be included. Note that each printing apparatus includes a large number of components other than the components listed in FIGS. 4A to 4F, e.g., an absorption unit, a carriage unit, and the like, and the degree of wear of each of these components can be managed as appropriate with the component maintenance management table.

The printing heads correspond to seven colors that are C (cyan), M (magenta), Y (yellow), LC (light cyan), LM (light magenta), G (gray), and K (black), and the component maintenance management table may manage the degree of wear of the printing heads of the respective colors. Although the degree of wear of each component managed in the component maintenance management table is updated every time a print job finishes in the present embodiment, the present invention is not limited thereto. The table may be updated for each page, rather than for each job, or may be updated at other break points.

In the present embodiment, when the degree of wear of a component becomes 90% or larger, a message for prompting maintenance of this component is displayed on the operation panel 210 when next printing is executed in order to warn the user. Here, it is assumed that each printing apparatus is available until the degree of wear reaches 100%, which is the use limit of each component. In other words, when the degree of wear reaches 100%, the printing apparatus stops. Note that, although the reference value for warning display is 90% or larger, and the reference value for stopping each printing apparatus is 100% in the present embodiment, these reference values are not limited thereto as long as the reference value for warning display is smaller than the reference value for stopping the printing apparatus. For example, other values may be threshold values for these reference values, or a configuration may be employed in which maintenance is required at the point of time when the degree of wear reaches 90%.

Although the unit of the degree of wear is a percentage (%) in the present embodiment, the unit is not limited thereto. For example, actual values may be used as the unit, e.g., energizing time and a dot count may be used as units for the drying unit and the printing heads, respectively, or other units may also be used. FIGS. 4A to 4F show an exemplary change of the degrees of wear when a certain print job is executed, and the details of the change of the degrees of wear will be described later.

Now, refer to FIG. 5 again. In step S502, a variable P, which is stored in a storage area such as a RAM and indicates the priority order, is initialized to 0. In the processing in FIG. 5, the variable P is used to sequentially reference the content of items in respective lines in the component maintenance management table. In step S503, the variable P is incremented. In step S504, it is determined whether or not the variable P is smaller than or equal to the number of lines in the component maintenance management table. Here, if it is determined that the variable P is smaller than or equal to the number of lines in the component maintenance management table, the processing proceeds to step S505, and if it is determined that the variable P is larger than the number of lines in the component maintenance management table, reference of the table is ended, and the processing proceeds to step S507.

In step S505, the degrees of wear of the component having the priority order P (variable P) in the respective printing apparatuses are acquired from the component maintenance management tables in FIGS. 4A to 4F. Next, in step S506, the degrees of wear of the component in the respective printing apparatuses acquired in step S505 are compared with each other, and it is determined whether or not there is a difference therebetween. Here, if it is determined that there is a difference, the processing proceeds to step S508. If it is determined that there is no difference, the processing returns to step S503, the next line in the table is referenced, and the same processing is repeated. In step S508, the printing apparatus with the smaller degree of wear according to the comparison result in step S506 is selected as the printing apparatus to be used this time.

The processing in step S507 is performed if it is determined in step S501 that the print job is a print job for two-sided printing, or if the variable P exceeds the number of lines in the table in step S504, i.e., if there is no difference in the degrees of wear of all components between the first printing apparatus 119 and the second printing apparatus 120. In step S507, a preset default printing apparatus is selected as the printing apparatus to be used this time. For example, in a possible default setting, the first printing apparatus 119 is used at the time of one-sided printing, and when performing two-sided printing, the first printing apparatus 119 is used in printing on the front face (first face) and the second printing apparatus 120 is used in printing on the back face (second face). However, the default setting is not limited thereto and may be set as appropriate.

In step S509, the component maintenance management tables in FIGS. 4A to 4F are referenced, and it is determined whether or not the printing apparatus selected in step S507 or S508 includes a component whose degree of wear is 90% or larger. In the case of two-sided printing, both the first printing apparatus 119 and the second printing apparatus 120 are used, and accordingly the processing proceeds to step S510 if it is determined that either apparatus includes a component whose degree of wear is 90% or larger. In the case of one-sided printing, the processing proceeds to step S511 if it is determined that the printing apparatus selected in step S508 does not include a component whose degree of wear is 90% or larger, and the processing proceeds to step S510 if it is determined that this apparatus includes a component whose degree of wear is 90% or larger.

In step S510, a message for prompting maintenance of the component whose degree of wear is 90% or larger is displayed on the operation panel 210. As mentioned above, since the printing apparatus is available until the degree of wear reaches 100%, the execution of the maintenance is not required at this point, but there is a possibility that the apparatus stops in the middle of execution of the next print job. In this regard, in the present embodiment, display of the message allows the user to recognize the necessity for executing maintenance of the printing apparatus.

In step S511, a print instruction is given to the printing apparatus selected in step S507 or S508. Thereafter, printing is executed by the designated printing apparatus. In step S512, the degree of wear of a component that has been worn and accumulated due to a printing operation is acquired from each printing apparatus, the component maintenance management tables in FIGS. 4A to 4F are updated, and this sequence ends.

A description will now be given of a specific processing flow in the case where a print job for one-sided printing is transmitted from the job control apparatus 118 to the controller 117, taking the component maintenance management tables in FIGS. 4A to 4F as an example. Note that the processing regarding a part that does not depend on the degree of wear in the component maintenance management table is as described above, and accordingly a description thereof will be partially omitted.

FIG. 4A is a component maintenance management table before printing, and jobs 1 to 5 are sequentially executed in the state indicated from this table. Here, it is assumed that the jobs 1 to 5 have the same content. FIG. 4B is a component maintenance management table after executing printing of the job 1, FIG. 4C is a component maintenance management table after executing printing of the job 2, FIG. 4D is a component maintenance management table after executing printing of the job 3, FIG. 4E is a component maintenance management table after executing printing of the job 4, and FIG. 4F is a component maintenance management table after performing maintenance of the drying unit.

First, it is assumed that the component maintenance management table is in the state shown in FIG. 4A. Upon the controller 117 receiving a print job for one-sided printing (job 1), it is determined in step S501 that the print job is for one-sided printing, and the processing proceeds to step S502. After step S503, it is determined in step S504 that the variable P is 1 and accordingly is smaller than or equal to the number of lines in the table that is 5, and the processing proceeds to step S505. In step S505, the degree of wear of the drying unit having the priority order 1 in each printing apparatus is acquired from the component maintenance management table in FIG. 4A. Since both the degree of wear in the first printing apparatus 119 and the degree of wear in the second printing apparatus 120 are 70%, it is determined in step S506 that there is no difference, and the processing returns to step S503.

Next, after steps S503 and S504, the degree of wear of the printing heads having the priority order 2 is acquired from the component maintenance management table in FIG. 4A in step S505. In this example, the degree of wear in the first printing apparatus 119 is 60% and the degree of wear in the second printing apparatus 120 is 40%, and it is accordingly determined in step S506 that there is a difference, and the processing proceeds to step S508. In step S508, the second printing apparatus 120 with the smaller degree of wear is selected as the printing apparatus to be used in printing of the job 1.

In step S509, the component maintenance management table in FIG. 4A is referenced, if it is checked that the second printing apparatus 120 does not include a component whose degree of wear is 90% or larger among the five components listed in the table, the processing proceeds to step S511. In step S511, a print instruction is given to the second printing apparatus 120, and printing is executed by the second printing apparatus 120. In step S512, the degree of wear of a component that has been worn due to printing is acquired from the second printing apparatus 120, the component maintenance management table is updated into the table in FIG. 4B, and this sequence ends.

FIG. 4B is the component maintenance management table after executing printing of the job 1. Although the degrees of wear of the components in the second printing apparatus 120 uniformly increase by 10% in this example for the sake of description, the present invention is not limited thereto. In reality, the ratio of the increase in the degree of wear depends on the components and also depends on the content of print jobs, and the degree of wear does not necessarily increase at a predetermined ratio. If a print job for one-sided printing (job 2) is further received in the state shown in FIG. 4B, processing similar to the above-described processing is repeated. It is then determined in steps S505 and S506 that there is a difference in the degree of wear of the drying unit having the priority order 1, and the first printing apparatus 119 is selected as the printing apparatus to be used in printing of the job 2 in step S508. In step S509, the component maintenance management table in FIG. 4B is referenced, and if it is checked that the first printing apparatus 119 does not include a component whose degree of wear is 90% or larger among the five components listed in the table, the processing proceeds to step S511. In step S511, a print instruction is given to the first printing apparatus 119, and printing is executed by the first printing apparatus 119. In step S512, the degree of wear of a component that has been worn due to printing is acquired from the first printing apparatus 119, the component maintenance management table is updated into the table in FIG. 4C, and this sequence ends.

FIG. 4C is the component maintenance management table after executing printing of the job 2. If a print job for one-sided printing (job 3) is further received in the state shown in FIG. 4C, processing similar to the above-described processing is repeated. It is then determined in steps S505 and S506 that there is a difference in the degree of wear of the printing heads having the priority order 2, and the second printing apparatus 120 is selected as the printing apparatus to be used in printing of the job 3 in step S508. In step S509, the component maintenance management table in FIG. 4C is referenced, and if it is checked that the second printing apparatus 120 does not include a component whose degree of wear is 90% or larger among the five components listed in the table, the processing proceeds to step S511. In step S511, a print instruction is given to the second printing apparatus 120, and printing is executed by the second printing apparatus 120. In step S512, the degree of wear of a component that has been worn due to printing is acquired from the second printing apparatus 120, the component maintenance management table is updated into the table in FIG. 4D, and this sequence ends.

FIG. 4D is the component maintenance management table after executing printing of the job 3. If a print job for one-sided printing (job 4) is further received in the state shown in FIG. 4D, processing similar to the above-described processing is repeated. It is then determined in steps S505 and S506 that there is a difference in the degree of wear of the drying unit having the priority order 1, and the first printing apparatus 119 is selected as the printing apparatus to be used in printing of the job 4 in step S508. In step S509, the component maintenance management table in FIG. 4D is referenced, and if it is checked that the first printing apparatus 119 does not include a component whose degree of wear is 90% or larger among the five components listed in the table, the processing proceeds to step S511. Here, although the second printing apparatus 120 includes a component whose degree of wear is 90% or larger, the second printing apparatus 120 is not used at this time, and accordingly the processing does not proceed to step S510. In step S511, a print instruction is given to the first printing apparatus 119, and printing is executed by the first printing apparatus 119. In step S512, the degree of wear of a component that has been worn due to printing is acquired from the first printing apparatus 119, the component maintenance management table is updated into the table in FIG. 4E, and this sequence ends.

FIG. 4E is the component maintenance management table after executing printing of the job 4. If a print job for one-sided printing (job 5) is further received in the state shown in FIG. 4E, similar processing is repeated. It is then determined in steps S505 and S506 that there is a difference in the degree of wear of the printing heads having the priority order 2, and the second printing apparatus 120 is selected as the printing apparatus to be used in printing of the job 5 in step S508. In step S509, the component maintenance management table in FIG. 4E is referenced, and the processing proceeds to step S510 since the degree of wear of the drying unit in the second printing apparatus 120 is 90%. In step S510, a message for prompting maintenance of the drying unit is displayed on the operation panel 210, and this sequence ends. Note that, although each printing apparatus is available until the degree of wear reaches 100% as mentioned above, the printing apparatus stops upon the degree of wear reaching 100%, and therefore, there is a possibility that the apparatus stops during printing of a job. Accordingly, a message for prompting maintenance is displayed when the degree of wear is 90%.

At this time, a message is displayed for prompting the user to replace the drying unit in both the first printing apparatus 119 and the second printing apparatus 120. This is because, in the present embodiment, control is performed such that the degrees of wear in the first printing apparatus 119 and the second printing apparatus 120 are similar. Accordingly, at the maintenance timing of one of the printing apparatuses, the maintenance timing of the other printing apparatus also has come or will come soon. The user performs maintenance of the drying unit in accordance with this message.

FIG. 4F is the component maintenance management table after performing maintenance of the drying unit. After the user performs maintenance of the drying unit in accordance with the message displayed on the operation panel 210, the degree of wear of the drying unit is updated to 0 in both the first printing apparatus 119 and the second printing apparatus 120.

After continuing the processing as described above, there is a possibility that the degree of wear of a component having a lower priority order, e.g., the reading sensor reaches 90% earlier in the second printing apparatus 120, and the maintenance for the second printing apparatus 120 cannot be performed simultaneously with the maintenance for the first printing apparatus 119. However, the maintenance work time for the reading sensor is 20 minutes, and is shorter than the 100-minute work time for the drying unit. Accordingly, even if the maintenance is performed on a component having a lower priority order (e.g., the reading sensor) in the first printing apparatus 119 and the second printing apparatus 120 at different timings, the stop time of the printing system can be made short as compared with the case of performing the maintenance of a component having a higher priority order (e.g., the drying unit) at different timings.

Figure 6A:
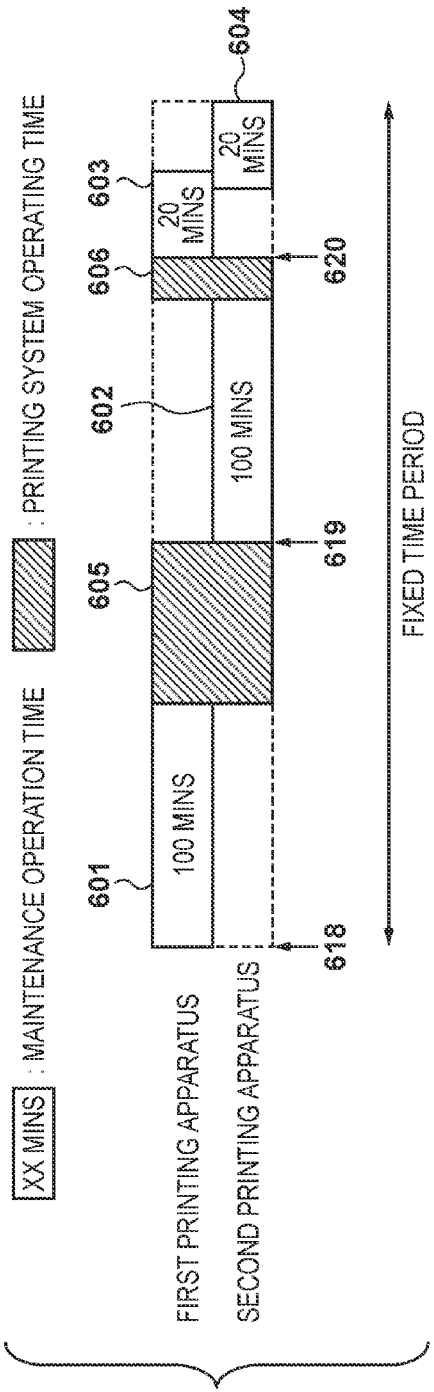
Figure 6B:
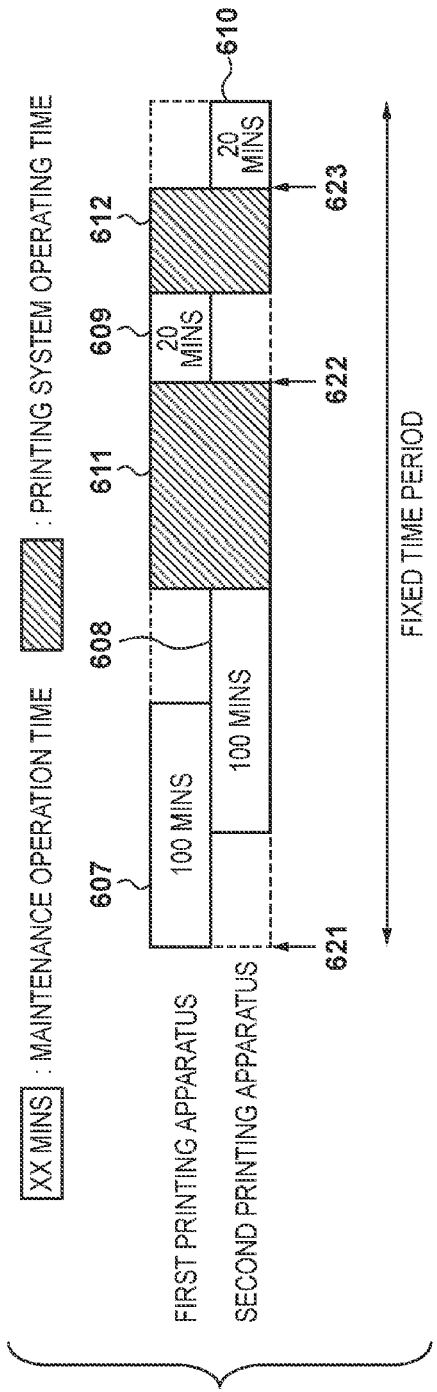

FIGS. 6A to 6D are diagrams showing the system operating time in the case where, during a fixed time period, the maintenance of the drying unit whose work time is 100 minutes and the maintenance of the reading sensor whose work time is 20 minutes are performed in both the first printing apparatus 119 and the second printing apparatus 120. FIGS. 6A and 6B show exemplary cases of a single maintenance user, and FIGS. 6C and 6D show exemplary cases of a plurality of maintenance users.

FIG. 6A is a diagram showing the system operating time in the case where the maintenance for which a work time is 100-minutes is performed at different timings, and the maintenance for which a work time is 20-minutes is performed at the same timing. FIG. 6B is a diagram showing the system operating time in the case where the maintenance for which a work time is 100-minutes is performed at the same timing, and the maintenance for which a work time is 20-minutes is performed at different timings. Time periods 601, 602, 603, 604, 607, 608, 609, and 610 are time periods during which a maintenance operation is performed, and the numeric value in each frame indicates the work time. Time periods 605, 606, 611, and 612 are time period during which maintenance is not performed, i.e., the printing system is operating.

As described above, since the first printing apparatus 119 and the second printing apparatus 120 in the tandem printing system are connected in tandem, if one of the printing apparatuses stops due to the maintenance operation, the entire printing system also stops. Timings 618, 619, 620, 621, 622, and 623 each indicate a timing at which a component in one of the printing apparatuses or both printing apparatuses reaches the maintenance timing. The timing 618 is a timing at which the drying unit in the first printing apparatus 119 reaches the maintenance timing. The timing 619 is a timing at which the drying unit in the second printing apparatus 120 reaches the maintenance timing. The timing 620 is a timing at which the reading sensors in both the first printing apparatus 119 and the second printing apparatus 120 reach the maintenance timing. The timing 621 is a timing at which the drying units in both the first printing apparatus 119 and the second printing apparatus 120 reach the maintenance timing. The timing 622 is a timing at which the reading sensor in the first printing apparatus 119 reaches the maintenance timing. The timing 623 is a timing at which the reading sensor in the second printing apparatus 120 reaches the maintenance timing.

Portions where the time periods 603 and 604 overlap and where the time periods 607 and 608 overlap are time periods where parallel operations can be performed. As mentioned above, maintenance includes not only an operation to be manually performed by a person but also processing to be automatically performed by each printing apparatus, and accordingly some operations can be performed in parallel even in the case of a single maintenance user. Since automatic processing often takes a longer time for the maintenance for which a work time is longer, and parallel operations can be performed during this automatic processing, the system operating time in FIG. 6B (time period 611+time period 612) is longer than the system operating time in FIG. 6A (time period 605+time period 606). As mentioned above, even in the case of a single maintenance user, the stop time of the printing system can be made shorter by performing control such that the maintenance for which a work time is long is performed simultaneously in the first printing apparatus 119 and the second printing apparatus 120.

Next, FIGS. 6A and 6B are exemplary cases of a single maintenance user, whereas exemplary cases of a plurality of maintenance users are as shown in FIGS. 6C and 6D. Time periods 613, 614, 615, 616, and 617 are time periods during which maintenance is not performed, i.e., the printing system is operating. Timings 624, 625, 626, 627, 628, and 629 each indicate a timing at which a component in one of the printing apparatuses or both printing apparatuses reaches the maintenance timing. The timing 624 is a timing at which the drying unit in the first printing apparatus 119 reaches the maintenance timing. The timing 625 is a timing at which the drying unit in the second printing apparatus 120 reaches the maintenance timing. The timing 626 is a timing at which the reading sensors in both the first printing apparatus 119 and the second printing apparatus 120 reach the maintenance timing. The timing 627 is a timing at which the drying unit in both the first printing apparatus 119 and the second printing apparatus 120 reach the maintenance timing. The timing 628 is a timing at which the reading sensor in the first printing apparatus 119 reaches the maintenance timing. The timing 629 is a timing at which the reading sensor in the second printing apparatus 120 reaches the maintenance timing. When there are a plurality of maintenance users, if a maintenance timing comes simultaneously in both printing apparatuses as at the timings 626 and 627, the maintenance can be performed simultaneously. Accordingly, the difference between the system operating time in FIG. 6C (time period 613+time period 614+time period 615) and the system operating time in FIG. 6D (time period 616+time period 617) is larger than in the case of a single maintenance user.

As described above, in the case of a plurality of maintenance users, the stop time of the printing system can be made shorter by performing control such that the maintenance for which a work time is long is performed simultaneously in the first printing apparatus 119 and the second printing apparatus 120.

Note that, although the controller 117 determines which printing apparatus is to be used in the present embodiment, the present invention is not limited thereto. For example, a configuration may be employed in which print data is transmitted from the controller 117 to the first printing apparatus 119, and the determination is performed by the engine control unit 430 in the first printing apparatus 119. In this case, if it is determined that printing is performed by the first printing apparatus 119, printing is executed thereafter, and if it is determined that printing is performed by the second printing apparatus 120, print data may be configured to be directly transferred to the second printing apparatus 120 or may be transferred thereto through the controller 117.

Although the flowchart shown in FIG. 5 is executed for each print job in the above-described present embodiment, the present invention is not limited thereto. For example, selection of the printing apparatus may be executed for each page, rather than for each job, or may be executed for every multiple jobs, or other units may also be used. The control, specifically the timing of printing apparatus selection may be changed depending on the state of the degree of wear. For example, a configuration may be employed in which the printing apparatus selection is normally executed for each job, and is executed for each page when there is a component whose maintenance timing will come soon.

Second Embodiment

The first embodiment has described an example where the degree of wear and the maintenance work time of each component are held in the component maintenance management table. The present embodiment will describe an example where a single wear unit is associated with a component group including one or more components, and when the wear unit reaches the maintenance timing, a total value of the maintenance work times of the components included in the component group is held.

FIG. 7 is a diagram showing an exemplary component maintenance management table in the present embodiment. The component maintenance management table holds the degree of wear of each wear unit included in the first printing apparatus 119 and the second printing apparatus 120, and the work time taken for maintenance such as replacement or cleaning that is performed when the wear unit has reached the maintenance timing. Furthermore, the component maintenance management table holds names of one or more components that need maintenance when the wear unit reaches the maintenance timing. In the component maintenance management table, priority order is given to each wear unit in descending order of the length of the total maintenance work time.

FIG. 7 shows five exemplary wear units, which are energizing time 1, dot count, energizing time 2, the number of times of back-face printing, and the number of read images. The degree of wear of the component group associated with an wear unit changes in accordance with this wear unit. For example, the component group associated with the energizing time 1 includes the drying unit, a humidifying unit, the conveyance roller, and the skew correction unit, each of which is a component worn with the energizing time 1. Note that the examples of the wear units are not limited to those shown in FIG. 7. For example, the degrees of wear of other wear units, such as an wear unit of the conveyance length, may be managed with the component maintenance management table. Although the degree of wear of the wear units included in each printing apparatus is updated every time a print job has finished in the present embodiment, the present invention is not limited thereto. For example, the table may be updated for each page, or may be updated at other break points. The component group of each wear unit may be subdivided in accordance with the lifetime (scheduled time at which replacement is required). Since the description of the degree of wear and the work time is the same as that in the first embodiment, a description thereof will be omitted.

A flow showing an overall sequence of a print control operation at the time of printing of a job in the second embodiment will be described with reference to FIG. 5. Steps S501 to S504 are similar to those in the first embodiment, and accordingly a description thereof will be omitted. In step S505, the degree of wear of an wear unit of a component having a priority order P (variable P) in each printing apparatus is acquired, in place of the degree of wear of a component having a priority order P, from the component maintenance management table in FIG. 7. Steps S506 to S512 are similar to those described in the first embodiment.

As shown in FIG. 7, an effect similar to that of the first embodiment is also achieved in the case of management using a component group based on an wear unit. That is to say, control can be performed such that maintenance for which a total maintenance work time is long is performed simultaneously in the first printing apparatus 119 and the second printing apparatus 120, and as a result, the stop time of the printing system can be made shorter. Although the above embodiment has described, as an example, components whose degree of wear changes in accordance with the wear unit, components that are worn to a similar degree in accordance with the operating time or the number of times of operation of each printing apparatus may be grouped.

Third Embodiment

The first embodiment has described an example where the degree of wear and the maintenance work time of each component are held in the component maintenance management table, whereas maintenance users of some components are different. The present embodiment will describe an exemplary case of providing priority orders based on users.

FIG. 8 is a diagram showing an exemplary component maintenance management table in the present embodiment. This component maintenance management table includes the component maintenance management tables in FIGS. 4A to 4F described in the first embodiment, as well as an additional item of maintenance users. The maintenance operation of some components can be performed by the user, whereas the maintenance operation of other components can be performed only by a person who has a special qualification. Accordingly, in the present embodiment, these users who can perform maintenance are held in the component maintenance management table. "OP" in FIG. 8 indicates an operator (user) who operates the printing apparatus. "SA" in FIG. 8 indicates a serviceperson. A serviceperson does not stay at a laboratory where the printing apparatuses are installed, but is sent from a service center to the laboratory when being contacted by the user. Note that, although the users are classified into two, namely OPs and SAs in FIG. 8, the present invention is not limited thereto. Users may be classified into three or more classes, and for example, a qualified user who has received education necessary for maintenance may be added.

Figure 9:
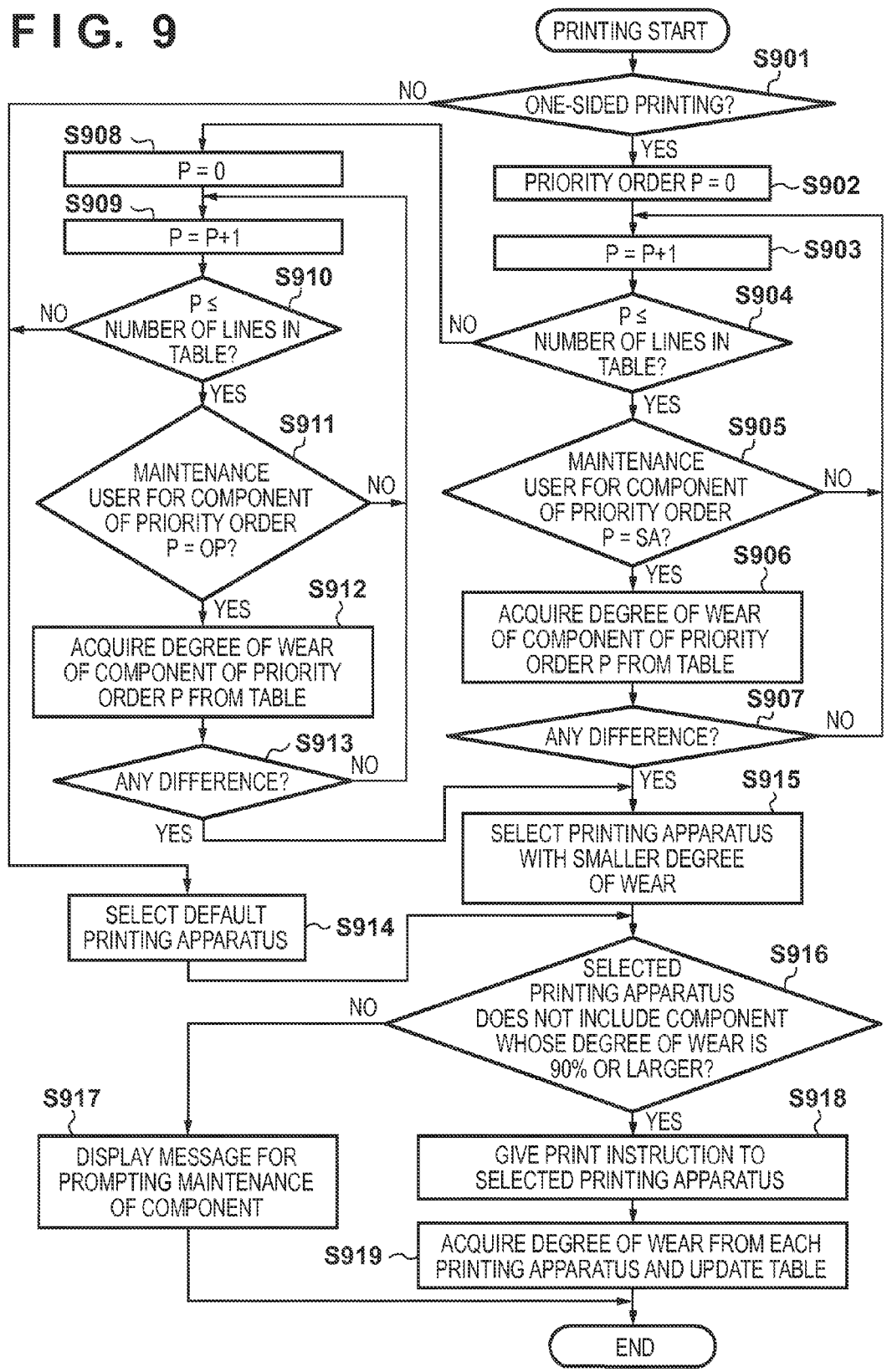
FIG. 9 is another flowchart showing a procedure of print control processing.

FIG. 9 is a flowchart showing an overall sequence of a print control operation at the time of printing of a job, the operation being controlled by the main control unit 201 of the controller 117. Steps S901 to S903 are similar to steps S501 to S503 in FIG. 5, and accordingly a description thereof will be omitted. In step S904, it is determined whether or not the variable P is smaller than or equal to the number of lines indicating the priority order in the component maintenance management table. If it is determined here that the variable P is smaller than or equal to the number of lines indicating the priority order in the component maintenance management table, the processing proceeds to step S905, and if it is determined that the variable P is larger than the number of lines indicating the priority order in the component maintenance management table, the processing proceeds to step S908.

In step S905, the class of the maintenance user for the component having the priority order P (variable P) is acquired from the component maintenance management table in FIG. 8. If the class is SA, the processing proceeds to step S906, and if the class is other than SA (in the present embodiment, OP), the processing returns to step S903, the next line in the component maintenance management table is referenced, and similar processing is repeated. Steps S906 and S907 are similar to steps S505 and S506 in FIG. 5, and accordingly a description thereof will be omitted.

The processing transitions to step S908 if it is determined in step S904 that the variable P is larger than the number of lines in the component maintenance management table, i.e., if there is no difference in the degrees of wear of all components corresponding to the maintenance user who is SA. Steps S908 to S910 are processing similar to that in steps S902 to S904.

In step S911, the class of the maintenance user for the component having the priority order P (variable P) is acquired from the component maintenance management table in FIG. 8. If the class is OP, the processing proceeds to step S912, and if the class is other than OP (in the present embodiment, SA), the processing returns to step S909, the next line in the component maintenance management table is referenced, and similar processing is repeated. Steps S912 and S913 are processing similar to that in steps S906 and S907.

The processing transitions to step S914 if it is determined in step S901 that the print job is a print job for two-sided printing and if it is determined in step S910 that the variable P is larger than the number of lines in the table. The case where it is determined that the variable P is larger than the number of lines in the table is, in other words, the case where there is no difference in the degrees of wear of all components corresponding to a maintenance user who is SA or OP, in the first printing apparatus 119 and the second printing apparatus 120. Steps S914 to S919 are similar to steps S507 to S512 in FIG. 5, and accordingly a description thereof will be omitted.

In this manner, an additional effect is achieved by performing control such that the components corresponding to the maintenance user who is SA are given priority, and then maintenance for which a total work time is long is performed simultaneously in the first printing apparatus 119 and the second printing apparatus 120. For example, it is possible not only to make the stop time of the printing system shorter, but also to further reduce service costs.

A description will now be given with reference to FIGS. 6A to 6D. It is assumed that a user who handles the maintenance for which a work time takes a 100-minutes is the operator, and a user who handles the maintenance for which a work time takes 20-minutes is the serviceperson. In this case, it is necessary to call the serviceperson at the timing 620 in FIG. 6A and the timings 622 and 623 in FIG. 6B. In general, calling the serviceperson multiple times is inefficient and costly. Accordingly, in the case of giving priority to a reduction in the service costs over a reduction in the stop time of the printing system, the above-described effect is obtained with the present embodiment.

Note that, although a message is displayed on the operation panel 210 and the user performs the maintenance operation or calls the serviceperson when necessary in the above-described present embodiment, the present invention is not limited thereto. For example, a system may be configured such that the serviceperson is automatically called when a component corresponding to the maintenance user who is SA reaches the maintenance timing.

Fourth Embodiment

The first to third embodiments have described an example where the component maintenance management table is referenced and the printing apparatus to be used is selected when a difference in the percentage of the degree of wear is found. In the present embodiment, the printing apparatus to be used is selected while considering not only the percentage but also expected time until the maintenance timing.

FIG. 10 shows an exemplary component maintenance management table in the present embodiment. This component maintenance management table includes the component maintenance management tables in FIGS. 4A to 4F described in the first embodiment, as well as an additional item of expected time (minute(s)) until the maintenance timing of the printing apparatus with the larger degree of wear (%). The component maintenance management table holds the degree of wear by percentage (%), whereas there are cases where the time until the maintenance timing of components is different even if the components have the same percentage. For this reason, the meaning of the percentage indicating the degree of wear is made clearer by holding expected time until the maintenance timing. The expected time is calculated from the operating time from when the previous component maintenance was performed and the current degree of wear (%). The operating time is initialized to 0 when the previous maintenance was performed on the corresponding component, and the time period during which the printing apparatus is operating is measured as the operating time. Note that the operating time may be managed with the component maintenance management table, or each printing apparatus may hold the operating time in a storage area other than the component maintenance management table. The expected time is calculated by Equation (1) below.

$$\text{Expected time(minute(s))} = (\text{operating time(minute(s))}) * (100 - \text{degree of wear(\%)})) / \text{degree of wear(\%)} \quad (1)$$

A description will now be given by taking an example of the expected time until the maintenance timing of the drying unit in the first printing apparatus 119. For example, assuming that the operating time is 100800 minutes, since the degree of wear in the first printing apparatus 119 in FIG. 10 is 70%, the expected time is 43200 minutes according to Equation (1). Although FIG. 10 shows the expected time until the maintenance timing only of the printing apparatus (the first printing apparatus 119) with the larger degree of wear, the expected time of the components in both the first printing apparatus 119 and the second printing apparatus 120 calculated by Equation (1) are held. Note that the method for calculating the expected time is not limited to the above, and the expected time may be calculated by other equations as long as the expected time is based on the operating time and the current degree of wear. Alternatively, the expected time calculated by any method may be configured to be acquired.

Referencing the expected time of the drying unit and the printing heads in FIG. 10, the expected time at the time when the degree of wear is 70% is written in the entries of both the drying unit and the printing head, and it can be found that the expected time of the drying unit and that of the printing heads are 43200 minutes and 1200 minutes, respectively, and that there is a large difference therebetween. In such a case, the second printing apparatus 120 is selected if the printing apparatus to be used is determined based on the drying unit as in the first embodiment, and accordingly it is highly likely that only the printing heads in the second printing apparatus 120 reach the maintenance timing earlier. The maintenance work time of the printing heads is shorter than that of the drying unit, but the maintenance work time of the printing heads is 70 minutes, which is relatively long, and accordingly it is desired that the maintenance operation is performed simultaneously in the first printing apparatus 119 and the second printing apparatus 120 as much as possible. For this reason, in the present embodiment, if a certain condition is satisfied, the determination for selecting the printing apparatus to be used is not based on the drying unit but on the printing heads that correspond to the next priority order.

Figure 11:
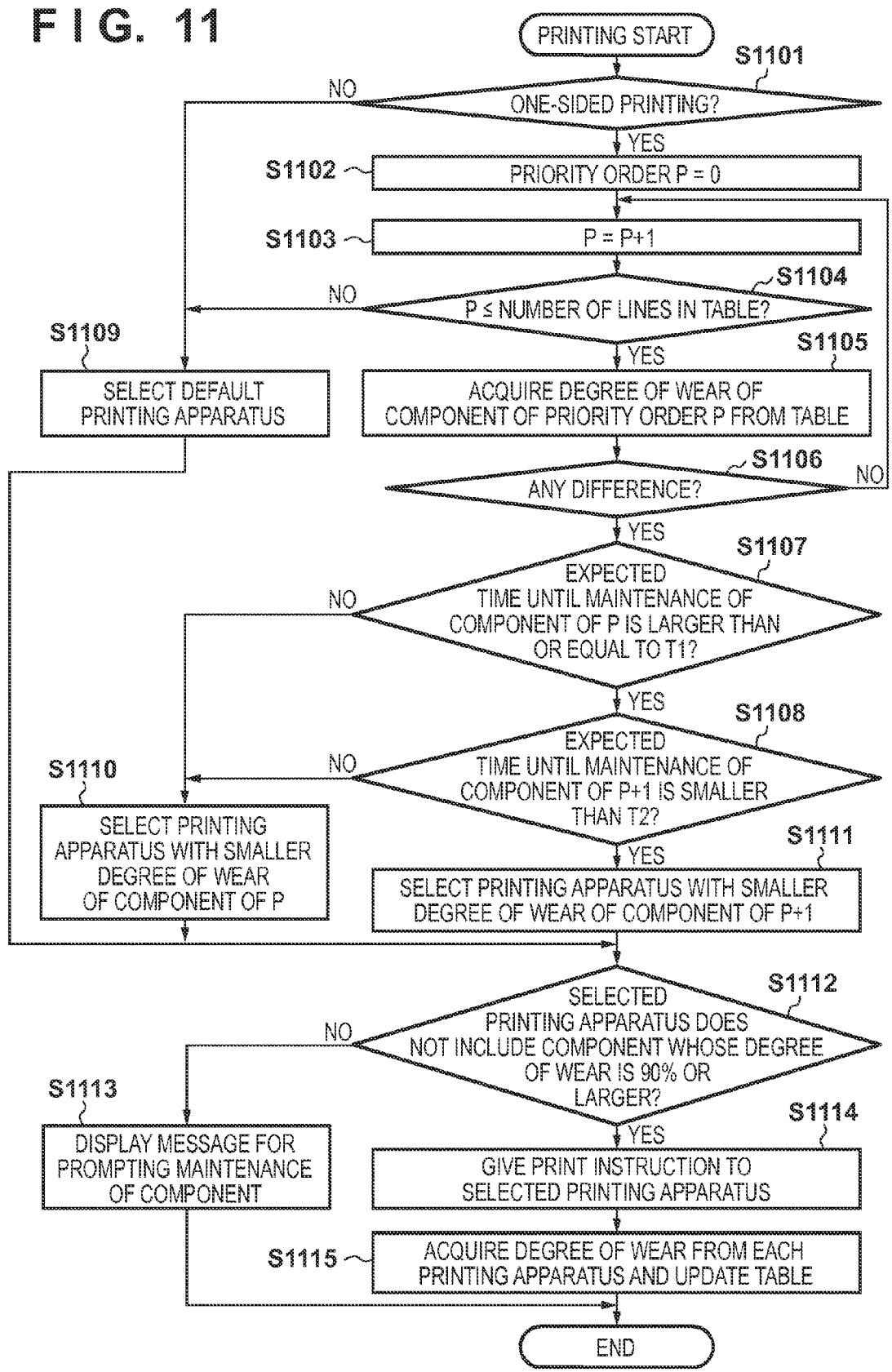
FIG. 11 is another flowchart showing a procedure of print control processing.

FIG. 11 is a flowchart showing an overall sequence of a print control operation at the time of printing of a job, the operation being controlled by the main control unit 201 of the controller 117. Processing in steps S1101 to S1105 are similar to processing in steps S501 to S505 in FIG. 5, and accordingly a description thereof will be omitted. In step S1106, it is determined that there is a difference in the degree of wear of the drying unit that corresponds to the variable P=1, and the processing proceeds to step S1107. In step S1107, it is determined whether or not the expected time until the maintenance timing in the printing apparatus with the larger degree of wear of the component corresponding to the priority order P is larger than or equal to a threshold value T1.

T1 will now be described. T1 is used in determination of whether or not the difference in the degree of wear between the first printing apparatus 119 and the second printing apparatus 120 can be reduced later even if not the second printing apparatus 120 but the first printing apparatus 119 with the larger degree of wear is selected as the printing apparatus to be used. T1 is calculated by Equation (2) below.

$$T1(\text{minute(s)}) = (\text{degree of wear(\%) of first printing apparatus} - \text{degree of wear(\%) of second printing apparatus}) / \text{degree of wear(\%) of first printing apparatus} * \text{operating time(minute(s))} \quad (2)$$

If the degree of wear of the second printing apparatus 120 is larger, T1 is calculated by Equation (3).

$$T1(\text{minute(s)}) = (\text{degree of wear(\%) of second printing apparatus} - \text{degree of wear(\%) of first printing apparatus}) / \text{degree of wear(\%) of second printing apparatus} * \text{operating time(minute(s))} \quad (3)$$

Taking an example of the drying unit in FIG. 10, the degree of wear of the first printing apparatus 119=70%, the degree of wear of the second printing apparatus 120=50%, the operating time=100800 minutes, and accordingly T1 is 28800 minutes. That is to say, in order to eliminate the difference in the degree of wear in the first printing apparatus 119 and the second printing apparatus 120, it is considered that the printing apparatus with the smaller degree of wear needs to operate 28800 minutes. Note that T1 may be calculated by other equations as long as T1 is based on the difference in the degree of wear between the first printing apparatus 119 and the second printing apparatus 120 and the operating time. For example, as described above, it is considered from Equation (1) that the second printing apparatus 120 with the smaller degree of wear needs to operate 28800 minutes in order to eliminate the current difference. However, since the difference further increases due to printing at this time by the first printing apparatus 119 with the larger degree of wear, this may be taken into consideration, e.g., a calculation equation in which T1 is multiplied by 1.5 may be used.

In step S1107, since the expected time of the component corresponding to the priority order P (variable P), i.e., the drying unit is 43200 minutes ≥T1(=28800 minutes), the processing proceeds to step S1108. On the other hand, if it is determined that the expected time is smaller than T1, the processing proceeds to step S1110. In step S1108, it is determined whether or not the expected time until the maintenance timing in the printing apparatus with the larger degree of wear of the component having the priority order P+1 is smaller than T2.

T2 will now be described. T2 is an arbitrary variable that can be set by the user. There are cases where the user who uses the printing system does not want to stop the printing system within a fixed time period. Specifically, in an exemplary case, there is a target number of jobs that the user wants to finish within a certain time period, and the user does not want to stop the printing system within a fixed time period in order to achieve the target. Assuming that this time period is T2, the present embodiment will describe an example where T2=1440 minutes. The value of T2 may be freely set from the operation unit 370 or the like by the user.

In step S1108, since the expected time of the component corresponding to the priority order P+1, i.e., the printing heads is 1200 minutes <T2 (=1440 minutes), the processing proceeds to step S1111. If it is determined here that the expected time is larger than or equal to T2, the processing proceeds to step S1110.

That is to say, the processing transitions to step S1110 if the result of the determination in step S1107 or S1108 is NO. In the above example, the processing transitions to step S1110 if it is determined in step S1107 that the expected time of the component corresponding to the priority order P is smaller than T1 or if it is determined in step S1108 that the expected time of the component having the priority order P+1 is larger than or equal to T2. That is to say, if it is determined in step S1107 that the expected time of the component corresponding to the priority order P is smaller than T1, it is determined that, even if the printing apparatus is selected based on other components in printing to be subsequently executed, it is unlikely that the degree of wear of the printing apparatus with the smaller degree of wear will be uniform with the degree of wear of the printing apparatus with the larger degree of wear. In this case, in step S1110, the printing apparatus with the smaller degree of wear is selected so as to make the maintenance timings of the component corresponding to the priority order P uniform.

Also, the processing transitions to step S1111 if the result of the determination in step S1108 is YES. In this case, it has been determined in step S1107 that the expected time of the component corresponding to the priority order P is larger than or equal to T1. That is to say, it is determined that, if the printing apparatus is selected based on other components in printing to be subsequently executed, it is highly likely that the degree of wear in the printing apparatus with the smaller degree of wear will be uniform with the degree of wear in the printing apparatus with the larger degree of wear. In this case, in step S1111, the printing apparatus with the smaller degree of wear of the component corresponding to the priority order P+1 is selected. In the above example, the printing apparatus with the smaller degree of wear of the printing head, i.e., the first printing apparatus 119 is selected as the printing apparatus to be used this time. Steps S1109 and S1112 to S1115 are the same as steps S507 and S509 to S512 in FIG. 5, and accordingly a description thereof will be omitted.

In this manner, since the drying unit is expected to take 43200 minutes until the maintenance timing, printing at this time is performed while giving priority to the printing heads that are expected to take 1200 minutes until the maintenance timing, thereby making the degrees of wear of the printing heads uniform. After the maintenance operation for the printing heads is simultaneously performed, the printing apparatus is selected so as to make the degrees of wear of the drying unit uniform. It is thereby possible to increase the possibility that, even when the degree of wear of each component is in a state shown in FIG. 10, the maintenance operation of each of the drying unit and the printing heads can be performed simultaneously in the first printing apparatus 119 and the second printing apparatus 120.

Note that there is also a possibility that the maintenance timing comes within a set time, depending on the value of T2. However, since it is possible to operate the printing system as long as possible and to cause the maintenance timings of the same component in the first printing apparatus 119 and the second printing apparatus 120 to come simultaneously, the stop time of the printing system can be made shorter.

If it is determined in step S1106 that there is a difference in the degree of wear of the component corresponding to the priority order P, the component having the next priority order, i.e., the component having the priority order P+1 is included in the determination targets. However, the present invention is not limited thereto. For example, two or more components may be included in the determination targets, or the determination targets may be dynamically changed based on the maintenance work time of the component corresponding to the priority order P. For example, control may be configured such that, assuming that the maintenance work time of the component corresponding to the priority order P is 100 minutes, components whose maintenance work time is up to 100/2=50 minutes are included in the determination targets.

The present invention is not limited to the above-described embodiments. For example, although a notification for prompting maintenance (replacement of a component) is given to the user by displaying a message in the above-described embodiments, the present invention is not limited thereto, and for example, a notification of maintenance may be given to the user by means of sound.

Although maintenance is prompted after determining whether or not there is a component whose degree of wear is 90% or larger in the selected printing apparatus in the above-described embodiments, the present invention is not limited thereto. For example, a configuration may be employed in which it is determined whether or not there is a component whose degree of wear is 90% or larger in all printing apparatuses included in the printing system, and a notification for prompting maintenance is given if there is a component whose degree of wear is 90% or larger in one or more printing apparatuses. Then, if there is a component whose degree of wear is 90% or larger in one or more printing apparatuses, maintenance of this component in all printing apparatuses included in the printing system may be performed. It is determined whether or not there is a difference in steps S506, S907, S913, and S1106 in the above-described embodiments, and in these steps, it may be determined that there is no difference if the difference regarding a component between the first printing apparatus 119 and the second printing apparatus 120 is within a predetermined range. Note that the predetermined range may be set in advance, or may be set by the user.

In the above-described embodiments, if it is determined in steps S501, S901, or S1101 that the print job is a print job for two-sided printing, the preset default printing apparatuses are used in printing, i.e., the first printing apparatus 119 and the second printing apparatus 120 are used in printing on the first face and the second face, respectively. However, the present invention is not limited thereto. For example, in the case of two-sided printing, printing faces to be printed respectively by the first printing apparatus 119 and the second printing apparatus 120 may be changed, i.e., the roles of the first printing apparatus 119 and the second printing apparatus 120 may be interchanged. For example, if a print job indicates that data for the front face (first face) is color image data and data for the back face (second face) is character data only in black color, a difference occurs in the degree of wear of the printing heads. In this case, for example, a configuration may be employed in which the degrees of wear of the printing heads other than the printing head for black in the first printing apparatus 119 and the second printing apparatus 120 are compared, and the color image data and the character data are printed respectively by the printing apparatus with the smaller degree of wear and the other printing apparatus. Furthermore, for example, a difference occurs in the degree of wear of the printing heads also in the case where the volume of print data for the front face (first face) is large and the volume of print data for the back face (second face) is small. Note that the print data mentioned here contains image data and character data. In this case, for example, a configuration may be employed in which the degrees of wear of the printing heads for a predetermined ink color in the first printing apparatus 119 and the second printing apparatus 120 are compared, and the first face and the second face are printed respectively by the printing apparatus with the smaller degree of wear and the printing apparatus with the larger degree of wear.

Although a single printing apparatus can print on only one of the first and second faces with the apparatus configuration in the above-described embodiments, a single printing apparatus may be configured to be able to print on both the first and second faces by attaching a rolling mechanism to each printing apparatus. In such a case, the printing apparatus to be used may be determined at every time of printing on the first face and the second face. If a determination result is that the same printing apparatus is to be used in printing on both the first and second faces, both faces can be printed by a single printing apparatus.

Although the priority order is determined based on the maintenance time in the third embodiment, the present invention is not limited thereto, and for example, the priority order may be determined based on the maintenance time for each user after determining the priority order of each user. In this case, for example, control may be performed using the flow in FIG. 5.

Although two printing apparatuses are used in the above-described embodiments, the present invention is not limited thereto, and control may be performed by a similar method also in the case where the printing system includes three or more printing apparatuses.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-266128, filed Dec. 24, 2013, which is hereby incorporated by reference herein in its entirety.

What is claimed is:

1. A print control apparatus which is able to control a plurality of printing apparatuses, the print control apparatus comprising:

an acquisition unit configured to acquire a degree of wear of a component used in each of the plurality of printing apparatuses, wherein a component type of the component is used in common in the plurality of printing apparatuses, and the component type needs a longer operation time required for a maintenance operation in a plurality of component types;

a selection unit configured to select a printing apparatus for executing print processing, which corresponds to the component having a smaller degree of wear, from the plurality of printing apparatuses, based on the degree of wear of the component acquired by the acquisition unit; and a control unit configured to cause the printing apparatus selected by the selection unit to execute the print processing, wherein the acquisition unit acquires the degree of wear of the component in accordance with a priority order of the plurality of component types, wherein higher priority is set to a component type which needs a longer operation time required for the maintenance operation.

2. The print control apparatus according to claim 1, further comprising a holding unit configured to hold a table containing information indicating degrees of wear of components of a plurality of component types in each of the plurality of printing apparatuses, wherein the acquisition unit acquires the degree of wear of the component from the table held by the holding unit; and an updating unit configured to update the information contained in the table, after the print processing is executed in the printing apparatus selected by the selection unit.

3. The print control apparatus according to claim 1, further comprising a determination unit configured to determine whether a difference of the degree of wear of the component, of each of the plurality of component types in the priority order, among the plurality of printing apparatuses is within a predetermined range, and wherein the selection unit selects the printing apparatus for executing the print processing, based on the degree of wear of the component which is determined by the determination unit that the difference is not within the predetermined range.

4. The print control apparatus according to claim 1, wherein in a case where there are a plurality of users who perform the maintenance operation of a component, the acquisition unit acquires the degree of wear of the component for which the maintenance operation is done by a user with high priority, wherein, in a case where a difference of the degree of wear of the component for which the maintenance operation is done by the user with high priority exists among the plurality of printing apparatuses, the selection unit selects the printing apparatus which corresponds to the component whose degree of wear is smaller.

5. The print control apparatus according to claim 1, wherein the acquisition unit further acquires a degree of wear of a component group including one or more components used in each of the plurality of printing apparatuses, and wherein the component group corresponds to a longer operation time required for the maintenance operation in a plurality of component groups, and in a case where the acquisition unit acquires the degree of wear of the component group, the selection unit selects the printing apparatus for executing the print processing from the plurality of printing apparatuses, based on the degree of wear of the component group acquired by the acquisition unit.

6. The print control apparatus according to claim 1, further comprising a specification unit configured to specify the component type from the plurality of component types, and wherein the acquisition unit acquires the degree of wear of the component of the component type specified by the specification unit.

7. The print control apparatus according to claim 1, further comprising a determination unit configured to determine whether a difference of the degree of wear of the component acquired by the acquisition unit exists among the plurality of printing apparatuses, and wherein, in a case where the determination unit determines that the difference of the degree of wear of the component acquired by the acquisition unit exists among the plurality of printing apparatuses, the selection unit selects the printing apparatus which corresponds to the component whose degree of wear is smaller.

8. The print control apparatus according to claim 7, wherein a priority order is set to the plurality of component types such that higher priority is set to a component type which needs a longer operation time required for the maintenance operation, and wherein, in a case where the determination unit determines that the difference of the degree of wear of the component acquired by the acquisition unit does not exist among the plurality of printing apparatuses, the acquisition unit acquires the degree of wear of a component of a next component type in accordance with the priority order.

9. The print control apparatus according to claim 7, wherein a priority order is set to the plurality of component types such that higher priority is set to a component type which needs a longer operation time required for the maintenance operation, and the determination unit determines whether the difference of the degree of wear of the component acquired by the acquisition unit exists among the plurality of printing apparatuses in accordance with the priority order.

10. The print control apparatus according to claim 1, further comprising a specifying unit configured to specify an expected time which is a time until a maintenance timing of the component, and wherein the selection unit selects the printing apparatus based on the degree of wear of the component acquired by the acquisition unit and the expected time specified by the specifying unit.

11. The print control apparatus according to claim 10, wherein the specifying unit specifies the expected time based on the degree of wear of the component acquired by the acquisition unit and an operating time from when a previous maintenance was performed.

12. The print control apparatus according to claim 1, further comprising a notification unit configured to notify a user of a message for prompting maintenance in a case where the printing apparatus selected by the selection unit has a component whose degree of wear is more than a threshold.

13. A print control method which is able to control a plurality of printing apparatuses, the print control apparatus comprising:

acquiring a degree of wear of a component used in each of the plurality of printing apparatuses, wherein a component type of the component is used in common in the plurality of printing apparatuses, and the component type needs a longer operation time required for a maintenance operation in a plurality of component types;

selecting a printing apparatus for executing print processing, which corresponds to the component having a smaller degree of wear, from the plurality of printing apparatuses, based on the degree of wear of the component acquired by the acquiring; and executing the print processing, wherein, in the acquiring, the degree of wear of the component is acquired in accordance with a priority order of the plurality of component types, wherein higher priority is set to a component type which needs a longer operation time required for the maintenance operation.

14. The print control method according to claim 13, wherein, in the acquiring, the degree of wear of the component is acquired from a table containing information indicating degrees of wear of components of a plurality of component types in each of the plurality of printing apparatuses.

15. A non-transitory computer readable storage medium storing a program for causing a computer to execute:

acquiring a degree of wear of a component used in each of the plurality of printing apparatuses, wherein a component type of the component is used in common in the plurality of printing apparatuses, and the component type needs a longer operation time required for a maintenance operation in a plurality of component types;

selecting a printing apparatus for executing a print processing, which corresponds to the component having a smaller degree of wear, from the plurality of printing apparatuses, based on the degree of wear of the component acquired by the acquiring; and executing the print processing, wherein, in the acquiring, the degree of wear of the component is acquired in accordance with a priority order of the plurality of component types, wherein higher priority is set to a component type which needs a longer operation time required for the maintenance operation.

16. A printing system comprising:

a plurality of printing apparatuses;

an acquisition unit configured to acquire a degree of wear of a component used in each of the plurality of printing apparatuses, wherein a component type of the component is used in common in the plurality of printing apparatuses, and the component type needs a longer operation time required for a maintenance operation in a plurality of component types;

a selection unit configured to select a printing apparatus for executing a print processing, which corresponds to the component having a smaller degree of wear, from the plurality of printing apparatuses, based on the degree of wear of the component acquired by the acquisition unit; and a control unit configured to cause the printing apparatus selected by the selection unit to execute the print processing, wherein the acquisition unit acquires the degree of wear of the component in accordance with a priority order of the plurality of component types, wherein higher priority is set to a component type which needs a longer operation time required for the maintenance operation.

* * * * *